(12) United States Patent
Goswami et al.

(10) Patent No.: US 10,497,032 B2
(45) Date of Patent: Dec. 3, 2019

(54) IMAGE QUALITY ASSESSMENT TO MERCHANDISE AN ITEM

(71) Applicant: eBay Inc., San Jose, CA (US)

(72) Inventors: Anjan Goswami, Sunnyvale, CA (US); Naren Chittar, San Jose, CA (US); Ali Dasdan, San Jose, CA (US); Sanjay Pundlkrao Ghatare, San Jose, CA (US); Sandip Namdeo Gaikwad, Sunnyvale, CA (US); Sung Hwan Chung, Fremont, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 15/015,281

(22) Filed: Feb. 4, 2016

(65) Prior Publication Data

US 2016/0154822 A1 Jun. 2, 2016

Related U.S. Application Data

(63) Continuation of application No. 14/180,255, filed on Feb. 13, 2014, now Pat. No. 9,519,918, which is a
(Continued)

(51) Int. Cl.
*G06K 9/00* (2006.01)
*G06Q 30/02* (2012.01)
(Continued)

(52) U.S. Cl.
CPC ... *G06Q 30/0276* (2013.01); *G06F 16/24578* (2019.01); *G06F 16/58* (2019.01);
(Continued)

(58) Field of Classification Search
None
See application file for complete search history.

(56) References Cited

U.S. PATENT DOCUMENTS 5,268,967 A * 12/1993 Jang ............... G06T 7/0012
382/132
5,293,543 A * 3/1994 Okabe ............ H04N 17/02
348/187

(Continued)

OTHER PUBLICATIONS

"U.S. Appl. No. 13/300,305, Examiner Interview Summary dated Oct. 23, 2013", 3 pgs.

(Continued)

*Primary Examiner* — Feng Niu
(74) *Attorney, Agent, or Firm* — Schwegman Lundberg & Woessner, P.A.

(57) ABSTRACT

Image-based features may be significantly correlated with click-through rates of images that depict a product, which may provide a more formal basis for the informal notion that good quality images will result in better click-through rates, as compared to poor quality images. Accordingly, an image assessment machine is configured to analyze image-based features to improve click-through rates for shopping search applications (e.g., a product search engine). Moreover, the image assessment machine may rank search results based on image quality factors and may notify sellers about low quality images. This may have the effect of improving the brand value for an online shopping website and accordingly have a positive long-term impact on the online shopping website.

20 Claims, 9 Drawing Sheets

Related U.S. Application Data continuation of application No. 13/300,305, filed on Nov. 18, 2011, now Pat. No. 8,675,957.

(60) Provisional application No. 61/415,177, filed on Nov. 18, 2010.

(51) Int. Cl.
*G06F 16/58* (2019.01)
*G06F 16/583* (2019.01)
*G06F 16/2457* (2019.01)
*G06T 7/00* (2017.01)

(52) U.S. Cl.
CPC ...... *G06F 16/5838* (2019.01); *G06F 16/5854* (2019.01); *G06Q 30/0243* (2013.01); *G06T 7/0002* (2013.01); *G06T 2207/30168* (2013.01)

(56) References Cited

U.S. PATENT DOCUMENTS

| | | | | |
|---|---|---|---|---|
| 5,915,250 A * | 6/1999 | Jain | .................. | G06F 16/58 |
| 5,943,441 A * | 8/1999 | Michael | .................. | G06T 7/194 |
| | | | | 382/199 |
| 5,983,237 A * | 11/1999 | Jain | .................. | G06F 17/30256 |
| 5,987,172 A * | 11/1999 | Michael | .................. | G06T 7/194 |
| | | | | 382/199 |
| 6,182,069 B1 * | 1/2001 | Niblack | .................. | G06F 17/3025 |
| 6,275,600 B1 | 8/2001 | Banker et al. | | |
| 6,324,545 B1 | 11/2001 | Morag | | |
| 6,446,060 B1 * | 9/2002 | Bergman | .................. | G06F 17/3025 |
| | | | | 707/770 |
| 6,711,287 B1 | 3/2004 | Iwasaki | | |
| 6,731,821 B1 * | 5/2004 | Maurer | .................. | G06K 9/40 |
| | | | | 382/263 |
| 6,806,870 B1 * | 10/2004 | Takanashi | .................. | G09G 5/003 |
| | | | | 345/204 |
| 6,915,024 B1 | 7/2005 | Maurer | | |
| 7,043,468 B2 * | 5/2006 | Forman | .................. | G06N 20/00 |
| | | | | 706/46 |
| 7,728,880 B2 * | 6/2010 | Hung | .................. | H04N 1/608 |
| | | | | 348/222.1 |
| 7,856,380 B1 | 12/2010 | Latin-stoermer et al. | | |
| 7,860,317 B2 * | 12/2010 | Xie | .................. | G06F 16/5854 |
| | | | | 382/195 |
| 7,904,349 B1 * | 3/2011 | Hart | .................. | G06Q 30/0641 |
| | | | | 705/27.1 |
| 7,912,279 B2 * | 3/2011 | Hsu | .................. | H04N 1/6027 |
| | | | | 358/516 |
| 8,090,222 B1 * | 1/2012 | Baluja | .................. | G06F 16/5838 |
| | | | | 382/305 |
| 8,140,438 B2 | 3/2012 | Nasukawa | .................. | G06Q 30/02 |
| | | | | 705/14.49 |
| 8,190,604 B2 * | 5/2012 | Wen | .................. | G06F 16/583 |
| | | | | 707/732 |
| 8,194,934 B2 * | 6/2012 | Eura | .................. | G06K 9/6255 |
| | | | | 340/5.53 |
| 8,249,318 B2 * | 8/2012 | Schmitt | .................. | G06K 9/6253 |
| | | | | 128/922 |
| 8,296,272 B2 * | 10/2012 | Obata | .................. | G06F 11/1435 |
| | | | | 707/691 |
| 8,331,669 B2 * | 12/2012 | Artan | .................. | G06T 7/162 |
| | | | | 382/173 |
| 8,494,909 B2 * | 7/2013 | Goncalves | .................. | G06Q 20/203 |
| | | | | 382/100 |
| 8,538,943 B1 * | 9/2013 | Bau | .................. | G06F 17/30867 |
| | | | | 707/706 |
| 8,548,996 B2 * | 10/2013 | Tareen | .................. | G06F 16/24578 |
| | | | | 707/732 |
| 8,605,105 B2 * | 12/2013 | Hong | .................. | G06T 11/001 |
| | | | | 345/589 |
| 8,644,600 B2 * | 2/2014 | Yang | .................. | G06K 9/621 |
| | | | | 345/592 |
| 8,675,957 B2 | 3/2014 | Goswami et al. | | |
| 8,712,862 B2 | 4/2014 | Gokturk et al. | | |
| 8,736,867 B1 | 5/2014 | Amidon et al. | | |
| 9,019,381 B2 * | 4/2015 | Guler | .................. | G01S 3/7864 |
| | | | | 348/169 |
| 9,026,526 B1 * | 5/2015 | Bau | .................. | G06F 17/30867 |
| | | | | 382/305 |
| 9,189,554 B1 * | 11/2015 | Bau | .................. | G06F 17/30867 |
| 9,411,827 B1 * | 8/2016 | Bau | .................. | G06F 17/30867 |
| 9,507,778 B2 * | 11/2016 | Jaffe | .................. | G06K 9/00664 |
| 9,519,918 B2 | 12/2016 | Goswami et al. | | |
| 9,721,292 B2 | 8/2017 | Agarwal et al. | | |
| 10,121,079 B2 * | 11/2018 | Guler | .................. | G01S 3/7864 |
| 2003/0123737 A1 * | 7/2003 | Mojsilovic | .................. | G06K 9/626 |
| | | | | 382/224 |
| 2004/0022439 A1 * | 2/2004 | Beardsley | .................. | G06K 9/00201 |
| | | | | 382/224 |
| 2004/0068449 A1 | 4/2004 | Suzuki et al. | | |
| 2005/0240376 A1 * | 10/2005 | Uwatoko | .................. | G03G 15/55 |
| | | | | 702/183 |
| 2005/0271279 A1 * | 12/2005 | Fujimura | .................. | G06K 9/00355 |
| | | | | 382/203 |
| 2006/0095234 A1 * | 5/2006 | Brignone | .................. | G01C 21/20 |
| | | | | 702/196 |
| 2006/0098875 A1 * | 5/2006 | Sugimoto | .................. | G06K 9/00597 |
| | | | | 382/190 |
| 2006/0143159 A1 * | 6/2006 | Chowdhury | .................. | G06F 16/33 |
| 2006/0212429 A1 * | 9/2006 | Bruno | .................. | G06F 17/30463 |
| 2006/0256388 A1 | 11/2006 | Erol et al. | | |
| 2007/0014468 A1 * | 1/2007 | Gines | .................. | G06T 7/0002 |
| | | | | 382/154 |
| 2007/0022003 A1 | 1/2007 | Chao et al. | | |
| 2007/0147700 A1 * | 6/2007 | Jeong | .................. | G06T 11/60 |
| | | | | 382/266 |
| 2007/0162397 A1 * | 7/2007 | Nasukawa | .................. | G06Q 30/02 |
| | | | | 705/54 |
| 2007/0248244 A1 | 10/2007 | Sato et al. | | |
| 2007/0253631 A1 | 11/2007 | Mccandlish et al. | | |
| 2008/0068384 A1 | 3/2008 | Achong et al. | | |
| 2008/0077564 A1 * | 3/2008 | Hattori | .................. | G06F 16/832 |
| 2008/0097981 A1 * | 4/2008 | Williams | .................. | G06F 16/58 |
| 2008/0101690 A1 * | 5/2008 | Hsu | .................. | H04N 1/6027 |
| | | | | 382/162 |
| 2008/0123993 A1 * | 5/2008 | Widdowson | .................. | G06T 11/60 |
| | | | | 382/284 |
| 2008/0140309 A1 * | 6/2008 | Jendbro | .................. | G01C 21/3614 |
| | | | | 701/533 |
| 2008/0154878 A1 * | 6/2008 | Rose | .................. | G06F 16/9535 |
| 2008/0278487 A1 * | 11/2008 | Gobert | .................. | G06K 9/00228 |
| | | | | 345/420 |
| 2008/0304735 A1 * | 12/2008 | Yang | .................. | G06K 9/621 |
| | | | | 382/164 |
| 2009/0070302 A1 * | 3/2009 | Moraleda | .................. | G06K 9/00463 |
| 2009/0070346 A1 | 3/2009 | Savona et al. | | |
| 2009/0092299 A1 * | 4/2009 | Jerebko | .................. | G06K 9/622 |
| | | | | 382/128 |
| 2009/0116747 A1 | 5/2009 | Duong et al. | | |
| 2009/0147988 A1 | 6/2009 | Jones et al. | | |
| 2009/0175535 A1 * | 7/2009 | Mattox | .................. | G06K 9/3241 |
| | | | | 382/164 |
| 2009/0220147 A1 * | 9/2009 | Batkilin | .................. | G06T 5/20 |
| | | | | 382/162 |
| 2009/0245633 A1 | 10/2009 | Bilcu et al. | | |
| 2009/0254455 A1 | 10/2009 | Rothey et al. | | |
| 2009/0278658 A1 | 11/2009 | Higashiyama | | |
| 2009/0297038 A1 | 12/2009 | Ishikawa et al. | | |
| 2009/0315996 A1 * | 12/2009 | Guler | .................. | G01S 3/7864 |
| | | | | 348/169 |
| 2009/0316962 A1 | 12/2009 | Sun et al. | | |
| 2010/0158412 A1 * | 6/2010 | Wang | .................. | G06F 16/5838 |
| | | | | 382/305 |
| 2010/0266214 A1 | 10/2010 | Jobson et al. | | |
| 2010/0303342 A1 * | 12/2010 | Berg | .................. | G06F 16/583 |
| | | | | 382/155 |
| 2011/0050703 A1 * | 3/2011 | Artan | .................. | G06T 7/11 |
| | | | | 345/440 |

(56) References Cited

U.S. PATENT DOCUMENTS

| | | | |
|---|---|---|---|
| 2011/0109620 A1* | 5/2011 | Hong | H04N 13/0037 345/419 |
| 2011/0182528 A1* | 7/2011 | Scherteler | G06T 3/4061 382/274 |
| 2011/0184950 A1* | 7/2011 | Skaff | G06F 17/30265 707/737 |
| 2011/0222127 A1* | 9/2011 | Loce | G06K 15/1843 358/3.27 |
| 2011/0302206 A1* | 12/2011 | Lipson | G06K 9/6206 707/771 |
| 2012/0113130 A1* | 5/2012 | Zhai | G06T 5/008 345/589 |
| 2012/0114173 A1* | 5/2012 | Ikenoue | G06T 7/194 382/103 |
| 2012/0128239 A1 | 5/2012 | Goswami et al. | |
| 2012/0128251 A1* | 5/2012 | Petrou | G06K 9/00456 382/182 |
| 2012/0268612 A1* | 10/2012 | Wang | G06K 9/00624 348/207.1 |
| 2013/0142418 A1 | 6/2013 | Van Zwol et al. | |
| 2014/0025690 A1* | 1/2014 | Tareen | G06F 16/24578 707/749 |
| 2014/0164146 A1 | 6/2014 | Goswami et al. | |
| 2014/0180758 A1 | 6/2014 | Agarwal et al. | |
| 2016/0063328 A1* | 3/2016 | Guler | G01S 3/7864 348/169 |

OTHER PUBLICATIONS

"U.S. Appl. No. 13/300,305, Non Final Office Action dated Jul. 10, 2013", 10 pgs.
"U.S. Appl. No. 13/300,305, Notice of Allowance dated Oct. 30, 2013", 13 pgs.
"U.S. Appl. No. 13/300,305, Response filed Jun. 18, 2013 to Restriction Requirement dated May 24, 2013", 14 pgs.
"U.S. Appl. No. 13/300,305, Response filed Oct. 10, 2013 to Non Final Office Action dated Jul. 10, 2013", 17 pgs.
"U.S. Appl. No. 13/300,305, Restriction Requirement dated May 24, 2013", 7 pgs.
"U.S. Appl. No. 13/300,305, Supplemental Amendment filed Oct. 17, 2013", 16 pgs.
"U.S. Appl. No. 13/724,650, Final Office Action dated Jul. 30, 2015", 17 pgs.
"U.S. Appl. No. 13/724,650, Non Final Office Action dated Jan. 15, 2015", 16 pgs.
"U.S. Appl. No. 13/724,650, Non Final Office Action dated Jan. 15, 2016", 17 pgs.
"U.S. Appl. No. 13/724,650, Response filed Apr. 13, 2016 to Non Final Office Action dated Jan. 15, 2016", 11 pgs.
"U.S. Appl. No. 13/724,650, Response filed Apr. 14, 2015 to Non Final Office Action dated Jan. 15, 2015", 21 pgs.
"U.S. Appl. No. 13/724,650, Response filed Oct. 13, 2015 to Final Office Action dated Jul. 30, 2015", 21 pgs.
"U.S. Appl. No. 14/180,255, Non Final Office Action dated Apr. 23, 2015", 25 pgs.
"U.S. Appl. No. 14/180,255, Notice of Allowance dated Sep. 23, 2015", 12 pgs.
"U.S. Appl. No. 14/180,255, Preliminary Amendment filed Feb. 27, 2014", 8 pgs.
"U.S. Appl. No. 14/180,255, Response filed Jul. 23, 2015 to Non Final Office Action dated Apr. 23, 2015", 22 pgs.
"U.S. Appl. No. 14/180,255, Supplemental Response filed Sep. 3, 2015 to Office Action dated Jul. 23, 2015", 8 pgs.
"U.S. Appl. No. 13/724,650, Advisory Action dated Jan. 9, 2017", 3 pgs.
"U.S. Appl. No. 13/724,650, Corrected Notice of Allowance dated Jun. 23, 2017", 2 pgs.
"U.S. Appl. No. 13/724,650, Final Office Action dated Sep. 1, 2016", 18 pgs.
"U.S. Appl. No. 13/724,650, Notice of Allowance dated Feb. 28, 2017", 12 pgs.
"U.S. Appl. No. 13/724,650, Response filed Dec. 1, 2016 to Final Office Action dated Sep. 1, 2016", 9 pgs.
"U.S. Appl. No. 13/724,650, Response filed Feb. 1, 2017 to Advisory Action dated Jan. 9, 2017", 14 pgs.

* cited by examiner

IMAGE QUALITY ASSESSMENT TO MERCHANDISE AN ITEM

CROSS-REFERENCE TO RELATED APPLICATIONS

This application is a continuation of U.S. patent application Ser. No. 14/180,255, filed on Feb. 13, 2014, which is a continuation of U.S. patent application Ser. No. 13/300,305, filed on Nov. 18, 2011, which claims the benefit of U.S. Provisional Patent Application No. 61/415,177, filed Nov. 18, 2010, the benefit of priority of each of which is claimed hereby, and each of which are incorporated by reference herein in its entirety.

TECHNICAL FIELD

The subject matter disclosed herein generally relates to the processing of data. Specifically, the present disclosure addresses systems and methods involving image quality assessments to merchandise an item.

BACKGROUND

A product may be available for purchase from a seller, and the seller may seek to merchandise one or more items as instances of the product. The product may take the form of a good or a service. Examples of goods include physical items (e.g., a digital camera or a car) and information items (e.g., downloaded data). Examples of services include human services (e.g., contracted work) and automated services (e.g., subscriptions). Other examples of products include authorizations (e.g., access to services, licenses, or encryption keys).

In merchandising an item, the seller may use a network-based system to present an advertisement of the item to a user of the network-based system (e.g., a potential buyer of the item). Examples of network-based systems include commerce systems (e.g., shopping websites), publication systems (e.g., classified advertisement websites), listing systems (e.g., auction websites), and transaction systems (e.g., payment websites). Examples of advertisements include banner advertisements, sidebar advertisements, pop-up advertisements, and tool tips. Furthermore, an advertisement of the item may take the form of a search result referencing the item, a listing for the item (e.g., within a list of items available for purchase), a review of the item, a comment on the item, or any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
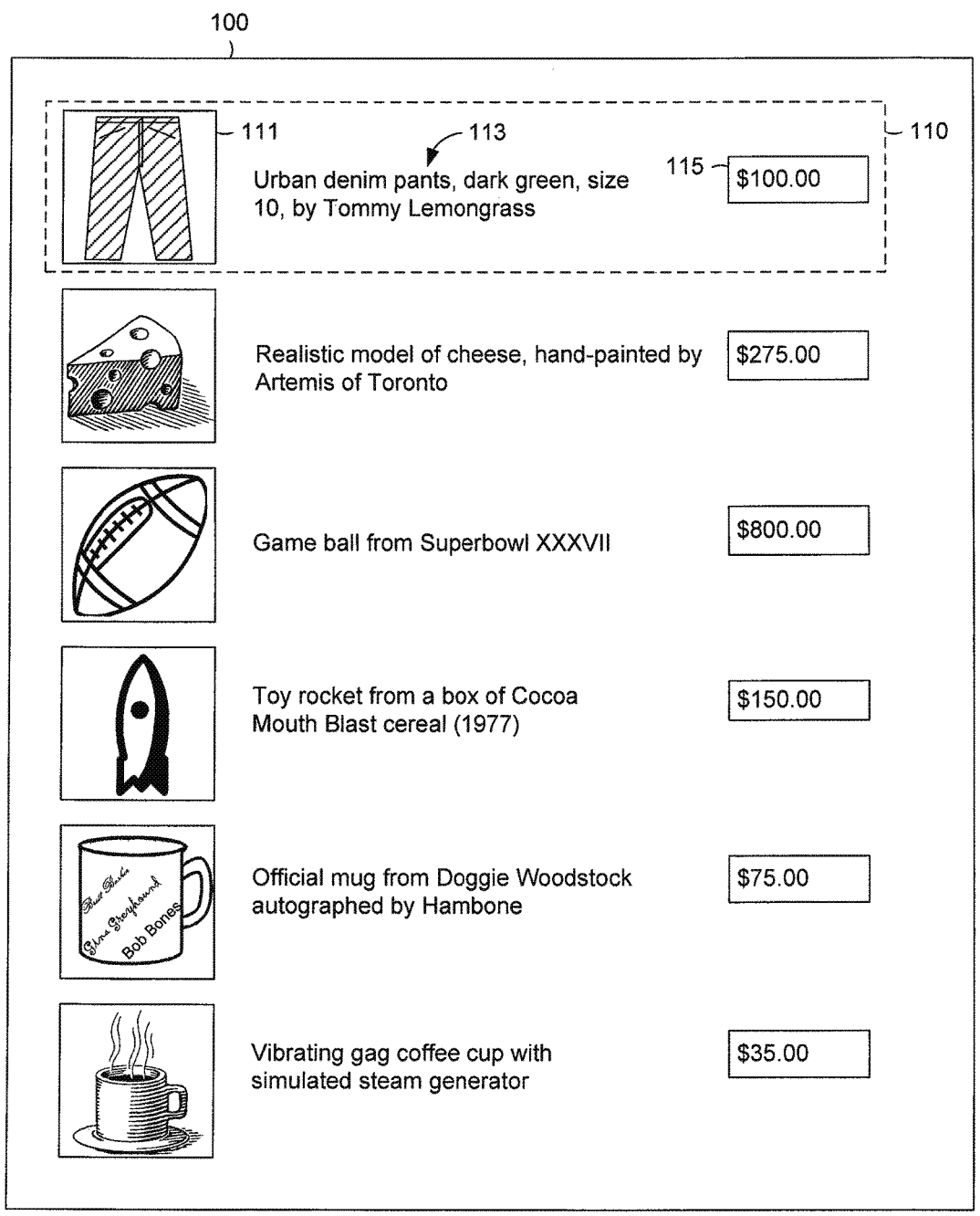
FIG. 1 is a diagram of a webpage containing advertisements for items, according to some example embodiments.

Example methods and systems are directed to image quality assessment to merchandise an item. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An advertisement for an item may include an image of the item (e.g., a digital photograph depicting the item). A network-based system may enable a seller of the item to create an advertisement for the item (e.g., using a user interface provided by the network-based system to a client device of the seller) by associating (e.g., by inclusion or by reference) an image of the item with the advertisement. For example, the seller may upload the image to the network-based system for inclusion in the advertisement. As another example, the seller may provide the network-based system with a reference (e.g., a pointer or an address) to the image, which may be stored in a database accessible by the network-based system.

In online shopping implementations, for example, a potential buyer may view an item by looking at an image of the item (e.g., an image included within an advertisement for the item). The item may be significantly characterized by its visual appearance (e.g., clothing, shoes, or jewelry). Accordingly, a seller, a potential buyer, or both, may desire that an image of an item reveal as much about the item as possible.

Images, however, may vary in visual quality, and the visual quality of an image may influence the effectiveness of an advertisement that includes the image. For example, the effectiveness of an advertisement may be indicated by its click-through rate (e.g., a number of clicks on the advertisement within a period of time or a percentage of displays of the advertisement that correspond to clicks on the advertisement). Accordingly, the effectiveness of an advertisement may be enhanced by inclusion of a high quality image, as compared to a low-quality image.

An image assessment machine may assess (e.g., analyze or compute) one or more characteristics of an image. The image may be submitted by the seller for inclusion in an advertisement or may be already included in an advertisement. A characteristic of the image may also be described as a feature of the image or an attribute of the image. The image assessment machine may be implemented as a general-purpose computer system (e.g., having at least a processor and a memory) configured as a special-purpose computer system by special-purpose software to perform any one or more of the methodologies described herein, in whole or in part.

Examples of image characteristics include brightness, contrast, saturation, colorfulness, and dynamic range. An indication of brightness may be an average grayscale intensity of an image. An indication of colorfulness may be a difference between a color as compared to grayscale. An indication of saturation may be an average level of color (e.g., in red-green-blue (RGB) color space). An indication of dynamic range may be a range of grayscale intensity from minimum intensity (e.g., darkest portion of the image) to maximum intensity (e.g., lightest portion of the image). An indication of contrast may be a ratio of a range of intensities to a sum of the maximum and minimum intensities. Another indication of contrast may be a standard deviation of intensities throughout the image.

Other examples of image characteristics include size factors (e.g., area, aspect ratio, height, or width). Moreover, characteristics assessed by the image assessment machine may include factors used in segmenting a foreground shape from its background within an image (e.g., foreground uniformity, background uniformity, image colorfulness, or foreground colorfulness). Where the image is segmented, the image assessment machine may calculate a ratio of foreground pixels to background pixels within the segmented image.

Based on assessing the characteristics of the image, the image assessment machine may determine one or more scores (e.g., numerical scores) that represent the characteristics. For example, the image assessment machine may determine an average brightness, a peak brightness, an average contrast, a peak contrast, a brightness L1 distance, a contrast L2 distance, a standard deviation of lightness (e.g., distance away from white in RGB color space), an average lightness (e.g., in RGB color space), a lightness of the background of the image, a score representing uniformity of background intensities (e.g., as approximation of texture in the background), or any suitable combination thereof.

The one or more scores may be represented as one or more vectors (e.g., a feature vector). For example, a feature vector may be determined for a particular image, and feature vectors for multiple images may be classified (e.g., by being processed with a classifier module of the image assessment machine) based on their probabilities of being "good quality" images (e.g., images that are likely to enhance the click-through rate of an advertisement). The classifier may determine an overall score (e.g., an overall quality score) for each image, based on one or more feature vectors of each image, where the overall score represents a relative probability of being a "good quality" image.

As examples of high quality images, images describable as "professional quality images" tend to have mostly white or light backgrounds, and the background tends to be uniform. In the foreground, the item may strongly contrast with the background, hence facilitating segmentation of the foreground from the background. The edge of the item may be continuous, and the image may be free from compression-related artifacts (e.g., blur, contouring, mosquito noise, or blocking). Moreover, the image may be taken from an appropriate direction and under proper lighting that presents the item well. Furthermore, the depiction of the item in the image tends to have a reasonable size (e.g., relative to the image as a whole) and tends to be in focus. In addition, such images are likely to have a reasonable aspect ratio (e.g., within a predetermined threshold distance from 1).

In contrast to high quality images, medium quality images (e.g., "OK" images) are not "professional quality," but may be considered reasonably acceptable by most people (e.g., users of the network-based system). The backgrounds may be moderately colored or textured. Contrast between the foreground and the background may be moderate. The edge of the item may be discontinuous (e.g., item is shown as truncated or "chopped off" in the image). Compression-related artifacts may be present in the image, and the image may be taken from a sub-optimal direction that presents the item adequately but not well.

Images may be described as low quality where the images have dark backgrounds (e.g., having mostly dark colors) or background patterns that are distracting, confusing, or ugly. The foreground and the background may have little contrast between them. The image may have an unusual or inappropriate aspect ratio (e.g., ratio of height to width). The depiction of the item in the image may be unreasonably small or unclear. The image itself may be unreasonably small (e.g., in resolution). A low quality image may have multiple depictions of the same product in the image.

Using one or more scores (e.g., an overall quality score) determined from the image, the image assessment machine may perform one or more operations pertinent to merchandising the item. For example, based on one or more scores for the image, the image assessment machine may notify the seller that the image is of low quality and prompt the seller to provide a higher quality image of the item. The image assessment machine may suggest or provide one or more alternative images (e.g., stored in a database accessible by the image assessment machine) to the seller.

As another example, the image assessment machine may raise a search rank of an advertisement that has a high quality image, or lower a search rank of an advertisement that has a low quality image, such that search results presented to a user are biased in favor of advertisements with high quality images. The image assessment machine may use one or more machine-learning techniques to perform analysis of the effectiveness of advertisements that are presented as search results. Based on this analysis, the image assessment machine may adjust its raising or lowering of search ranks.

As a further example, the image assessment machine may segment the image (e.g., into a foreground portion and a background portion) and determine the shape of the item depicted in the image. Where the advertisement of the item includes textual information describing the item (e.g., title, description, summary, price, product name, or manufacturer), the image assessment machine may analyze the textual information based on the shape of the item. For example, a seller may upload an image of a pair of pants and erroneously submit textual information describing the image as depicting "a hat." The image assessment machine, after segmenting the shape of the pair of pants from the image, may perform semantic analysis to distinguish images that are more informative, more aesthetically pleasing, or both. For example, the image assessment machine may access a database that correlates that particular shape with the word "pants" but does not correlate that particular shape with the word "hat." Based on the accessing of the database, the image assessment machine may notify the seller of the potential error (e.g., "The item in the image does not look like a hat.").

In yet another example, the image assessment machine may determine, based on the shape of the item, that the image depicts an item that matches the textual information describing the item (e.g., the image actually shows a hat) and also determine that the image contains a poor depiction of the item. Accordingly, the image assessment machine may notify the seller that the image is a low quality image that may adversely impact merchandising of the item (e.g., "The image of the hat is confusing," or "it is hard to see the hat in the image you uploaded.").

In a further example, the image assessment machine may identify or suggest, based on the shape of the item depicted in the image, a potential problem with the image, a potential suggestion for taking a better image, or both. The image assessment machine may notify the seller that the image has been truncated (e.g., clipped), rotated, or skewed, or that the item is shown in a bad pose (e.g., folded) or shown with bad lighting.

In addition, the semantic analysis may be performed by the image assessment machine to identify (e.g., recognize) the item depicted in the image (e.g., among multiple objects depicted in the image). For example, where several objects are depicted in an image, but the textual information describes the image as depicting "a hat," the image assessment engine may identify a particular hat-like object as being the most relevant object in the image. Accordingly, the image assessment engine may determine that the hat-like object is the item shown in the image.

In some example embodiments, the image assessment machine may identify (e.g., recognize) a style of the item based on the shape of the item depicted in the image. As an example, where the item is a dress, the image assessment machine may recognize that the dress is a "sleeveless" dress, a "low-cut" dress, or a dress with an "A-line skirt," based on the shape of the dress as depicted in the image. The style of the item may be used or suggested by the image assessment machine as further textual information (e.g., a tag) describing the item.

Moreover, the semantic analysis may include detection of text in the image (e.g., product name, brand name, manufacturer name, or designer name). For example, optical character recognition (OCR) techniques may be used by the image assessment machine to recognize textual information in the image (e.g., human-readable or machine-readable). Similarly, the semantic analysis may include detection of a watermark (e.g., text or logo) in the image. Also, the image assessment machine may detect a human model depicted in the image (e.g., face, eyes, nose, mouth, or hand). The textual information from an advertisement (e.g., as submitted by a seller) may be compared to the detected text, watermark, human model, or any suitable combination thereof. The image assessment machine may perform this comparison and accordingly suggest or provide additional textual information for inclusion in the advertisement.

In some example embodiments, the image assessment machine identifies the shape of undesired overlays in the image. An overlay in the image may be undesired by the seller, a potential buyer, an operator of the network-based system, or any suitable combination thereof. Examples of undesired overlays include vulgar or offensive graphics or text, information redirecting potential buyers to a competitor of the network-based system, and information redirecting potential buyers to a competitor of the seller. The image assessment machine may identify the shape of an undesired overlay by segmenting the image (e.g., into foreground and background portions). According to certain example embodiments, this may be performed without the use of OCR techniques (e.g., without recognizing the meaning of undesired text).

According to various example embodiments, the image assessment machine recognizes multiple images that depict the same item. This recognition may be based on the shape of the item depicted in the images. Moreover, one or more color diffusion algorithms may be used by the image assessment machine to recognize the item in multiple images. For example, two images of the same product may have different histograms (e.g., as a result of being photographs taken under different lighting conditions). The image assessment machine may use one or more color diffusion algorithms to allocate energy represented in a histogram into one or more partitions (e.g., bins) in a manner that spreads (e.g., blurs) the energy among neighboring partitions. The number of partitions used may vary among certain example embodiments, some of which use a relatively small number of partitions (e.g., to reduce computational effort). Accordingly, the same item may be identified in two different-looking images.

Image-based features may affect a click-through rate for an image, for example, in the context of a large-scale product search engine. Product search engines may use text-based features in ranking products returned as search results. A product search engine (e.g., incorporating an image assessment machine, discussed above) may use image-based features in addition to text-based features. In some example embodiments, the product search engine may use a stochastic gradient boosting regression model to model a click-through rate. Based on experimental results, there is a statistically significant correlation between image features and click-through rate.

Online shopping constitutes a significant portion of commerce. Convenience may be an advantage of online shopping, but an inability to touch and feel the product may be a drawback. Images therefore may play an important role in online shopping. Good quality images may provide a better user experience by providing a better idea of the product features and conditions. Good quality images also may improve the brand image of the seller.

Product search engines may function as gateways for users into the world of online shopping. Typically, a user submits a query into a product search engine, and the product search engine presents the user with a search results page (SRP). The SRP contains a list of search results. Each entry in the list of search results may include an image accompanied by one or more product attributes (e.g., product title, summary, price etc.). The user may look at the image and the textual data and then make a decision to buy the product or click on the entry for further information.

Many product search engines are small in scale, and images of products may be manually edited (e.g., selected, modified, or approved) before the images are used by the system for search results. This may have the effect of ensuring that high quality images are displayed. However, in a large scale online market without manual editing of images, the variance in the quality of images may be significant. In such cases, it may be desirable to incorporate image features into one or more ranking models such that relevant results with good images get ranked more highly compared to relevant results with bad images. This may serve as an incentive for sellers to make efforts to submit high quality images. A prevalence of results having high quality images also may drive additional buyer traffic to the online market, thereby benefiting all sellers. Accordingly, there may be a long-term value in incorporating image-based features into a ranking model. For example, use of the image-based features in the ranking model may gradually improve the brand value of the product search engine.

Image features may be considered using two classes: global features and regional features. Global features may be computed over an entire image (e.g., a whole image) and may be represented as global statistics over the entirety of the image. Examples of global features include brightness and contrast.

Brightness may be representative of an amount of illumination within the image. Brightness may be computed as a normalized average grayscale intensity of the image. For example, brightness may be computed from RGB primaries in an RGB colorspace using the expression:

$$0.3R+0.6G+0.1B$$

Contrast may be representative of a variation in visual properties that makes an object in the image appear clearer to a viewer. Multiple kinds of contrast may be supported by the image assessment machine. An example of contrast is root mean square contrast, computed from the following expression:

$$\sqrt{\frac{1}{MN} \sum_{i=0}^{N-1} \sum_{j=0}^{M-1} (I_{i,j} - \bar{I})}$$

where A M×N is the size of the image, where I is the grayscale intensity, and where $\bar{I}$ is the average intensity of the image.

Regional features may be non-global. For example, a product image may detect an object placed against a background. Regional features may be computed separately for the background and for the foreground object. The image assessment machine may derive information from the foreground individually, from the background individually, from comparing the foreground to the background, or any suitable combination thereof. In some example embodiments, the image assessment machine segments the image into a background and the foreground. For example, a Grabcut-based approach (e.g., an implementation of the Grabcut algorithm) may be used to segment the image. As noted above, good image quality may facilitate image segmentation (e.g., to be more accurate or to be less computationally intensive). Examples of regional features include lightness of background, colorfulness of foreground, and ratio of background to foreground.

In many situations, a good product image has a light colored background. The image assessment machine, after segmenting the background from the image, may measure a quantity computed from the standard deviation and mean of the distance between the intensity of each color pixel and a reference color (e.g., white background color). For example, pure white may be represented in RGB color space as (255, 255, 255), and an L2 norm may be used by the image assessment machine to compute the distance of each pixel intensity from pure white. The expression:

$$\alpha\mu+\beta\sigma$$

may be used by the image assessment machine, where $\mu$ is the mean and $\sigma$ is the standard deviation, and where $\alpha$ and $\beta$ are constants (e.g., $\alpha=1$ and $\beta=0.3$).

Colorfulness of the foreground may be a quantity representative of human perception of color. Multiple kinds of colorfulness may be supported by the image assessment machine. For example, the image assessment machine may implement an expression based on the sRGB colorspace, as set forth in D. Hasler and S. E. Suesstrunk ("Measuring colorfulness in natural images," Proceeding of SPIE Electron. Imag.: Human Vision and Electron. Imag. VIII, 5007: 87-95, 2003).

The ratio of background to foreground may be computed by the image assessment machine by determining the ratio of the area of the foreground to the area of the background. In many situations, a larger ratio indicates that the product image size is large within the frame of the image.

In experiments, datasets were derived from query logs from an online shopping website. The datasets include tuples of the form (query, product identifier, click-through rate). A tuple, therefore, may represent a query submitted by a user, a product identifier, and the click-through rate for that product. The click-through rate for a product may be defined as number of clicks per impression for an item (e.g., per viewing of the image of the item). The datasets were derived from approximately 150,000 pairs of queries and products. In the experiments, the queries were not chosen randomly. An image assessment machine computed a text match score and extracted values of attributes that are visible in the search results page. The image assessment machine then trained a boosted tree-based regression model, using click-through rate as a target. Next, the image assessment machine added image features into the training dataset.

It was observed that the mean standard error for regression was reduced. Also, a normalized discounted cumulative gain (NDCG) improvement was observed, where the NDCG was computed using human judgment data. Table 1 summarizes the results obtained from the experiments.

TABLE 1

Regression study with image features

| Models | Mean Standard Error (MSE) | NDCG 5 | NDCG 10 |
|---|---|---|---|
| No image factors | 0.0209 | 0.8092 | 0.8719 |
| With image factors | 0.0207 | 0.8151 | 0.8761 |

The target in this case is the click-through rate of the item, given the query. The results show a slight improvement in NDCG at the 5th position and at the 10th position. Also, the results show a slight improvement in reducing the mean standard error (MSE) for the regression. Accordingly, the NDCG improvement may be significant where tuples are sampled from a product category (e.g., fashion) where images are more important than other attributes. Regression analysis techniques may provide a rank of significance for one or more features. In the experiments, it was observed that the colorfulness of foreground and the root-mean-square (RMS) contrast were the number one and two most significant image features for ranking.

In another experiment, approximately 1000 items from a fashion-related product category were studied for a correlation between image features and click-through rate. Tables 2 and 3 show the results of the study.

TABLE 2

Correlation study with image features

| Global features | Contrast | Brightness |
|---|---|---|
| $\rho$ | 0.14 | 0.10 |
| p-value | $10^{-6}$ | $10^{-8}$ |

In Table 2, $\rho$ is the Spearman's rank coefficient in the table. Also shown is the "p-value" for the experiment. It was observed that the lightness of the background is most correlated with click-through rate, which is consistent with the anecdotal marketing wisdom that a product depicted against a lighter background is better emphasized compared to product depicted against darker backgrounds.

TABLE 3

Correlation study with image features

| Regional features | Lightness of background | Colorfulness of foreground | Ratio of foreground area to background area |
|---|---|---|---|
| ρ | 0.21 | 0.15 | 0.10 |
| p-value | $10^{-16}$ | $10^{-4}$ | $10^{-6}$ |

Tables 2 and 3 show that the image features studied in the experiment are correlated with click-through rate and that the correlations are statistically significant. It should be appreciated that the importance of the image features, as ranked by a particular regression model, may be different from the importance of the image features based on a correlation study. Moreover, an image assessment machine may compute additional features from images, beyond the global or regional features described herein, and use these additional features in performing assessments of image quality.

Based on the experiments, it was observed that image-based features may be significantly correlated with click-through rate, which may provide a more formal basis for the informal notion that good quality images will result in better click-through rates, as compared to poor quality images. Accordingly, image-based features may facilitate modeling click-through rates for shopping search applications (e.g., a product search engine). Moreover, ranking search results based on image quality factors may provide sellers with an incentive to provide high quality images. This may have the effect of improving the brand value for an online shopping website and, accordingly, have a positive long-term impact on the online shopping website.

FIG. 1 is a diagram of a webpage 100 containing advertisements for items, according to some example embodiments. As an example, an advertisement 110 is an advertisement for pants that are available for purchase from a seller of the pants. The pants are the item that is to be merchandised by the advertisement 110. The advertisement 110 includes an image 111 of the item and a description of the item (e.g., "Urban denim pants, dark green, size 10, by Tommy. Lemongrass"). The description of the item includes textual information 113 (e.g., "pants") that describes the item or is submitted for inclusion in the description of the item. For example, the textual information 113 may be submitted by the seller of the pants (e.g., one or more seller-submitted tokens, words, or phrases). As another example, the textual information 113 may be suggested by an image assessment machine (e.g., based on an analysis of the image 111). The advertisement 110 also includes a price 115 (e.g., "$100.00") of the pants. Other advertisements appearing in the webpage 100 may be structured in a manner similar to the advertisement 110.

Figure 2:
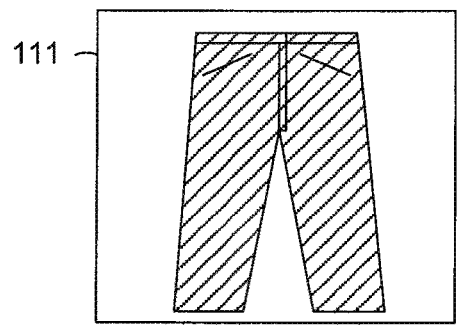
FIG. 2 is a diagram illustrating images of varying quality, according to some example embodiments.
Figure 2:
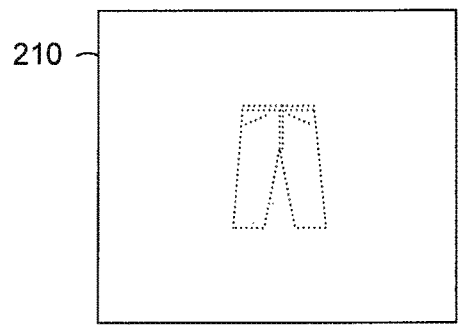
Figure 2:
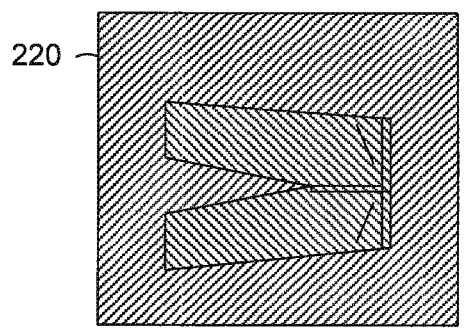
Figure 2:
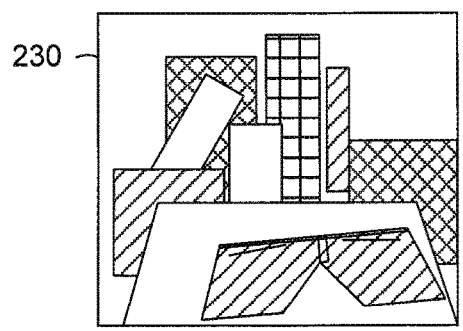
Figure 2:
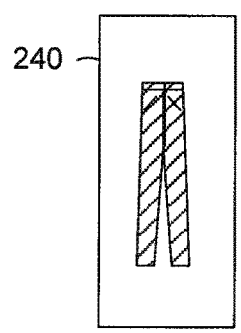
Figure 2:
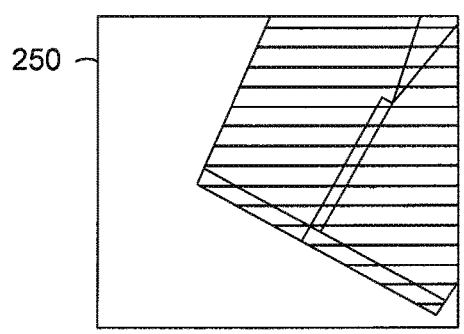

FIG. 2 is a diagram illustrating images 111 and 210-250, which are of varying quality, according to some example embodiments. The image 111 may be a high-quality image (e.g., an image with high visual quality for purposes of merchandising the item depicted therein), while the images 210, 220, 230, 240, and 250 may be low-quality images (e.g., images with low visual quality for purposes of merchandising the item depicted therein).

As shown, the image 111 is an example of a high-quality image (e.g., an image that is relatively high in visual quality relative to the images 210-250). For example, the image 111 may depict the item (e.g., the pants) in clear focus and with well-defined edges. The item (e.g., as a foreground portion of the image 111) may be shown prominently and take up a large percentage or ratio of the size (e.g., total area) of the image.

The image 111 may have one or more visual characteristics that are correlated with an effectiveness (e.g., as measured in actual click-through counts or modeled projected click-through counts) for merchandising items. For example, these visual characteristics may be correlated with high effectiveness (e.g., relative to other images) in merchandising items. Furthermore, one or more of these visual characteristics may be quantifiable (e.g., computationally calculable) by an analysis of the image 111. Examples of such visual characteristics include brightness (e.g., average brightness), contrast (e.g., average contrast), saturation (e.g., color intensity relative to brightness), colorfulness (e.g., distance away from gray within a color space), dynamic range (e.g., for brightness, contrast, or color), size (e.g., total area, total width, or total height), aspect ratio (e.g., of width to height), lightness (e.g., distance away from white within a color space), foreground uniformity (e.g., average foreground uniformity), background uniformity (e.g., average background uniformity), and the ratio of foreground pixels (e.g., the number of pixels in the foreground portion of the image 111) to background pixels (e.g., the number of pixels in the background portion of the image 111).

The image 111 may include image data (e.g., digital data representing or encoding an array of pixels that, in aggregate, form the visual picture presented by the image 111). Hence, one or more of the visual characteristics of the image 111 may be quantifiable by analysis of the image data contained in the image 111. According to various example embodiments, the image 111 may be a data file (e.g., stored within memory or in a data repository) that includes the image data (e.g., along with metadata describing the image 111).

As shown, the image 210 is an example of a low-quality image (e.g., relative to the image 111). In the image 210, the item is depicted as too small within the image 210 (e.g., with a low ratio of foreground pixels to background pixels). The image 210 is also too bright and insufficiently well-defined (e.g., low sharpness).

The image 220 is another example of a low-quality image (e.g., relative to the image 111). As shown, the image 220 depicts the item with a mediocre orientation (e.g., sideways for a pair of pants) within the image 220. The image 220 is also too dark and has poor contrast between foreground and background portions of the image 220.

The image 230 is a further example of a low-quality image (e.g., relative to the image 111). As shown, the image 230 depicts the item with a very poor orientation (e.g., a severely oblique view) and with a cluttered and nonuniform background. In addition, the item is poorly centered within the image 230 (e.g., placed in the lower right portion of the image 230).

The image 240 is yet another example of a low-quality image (e.g., relative to the image 111). As shown, the image 240 has a very low aspect ratio (e.g., of width to height) and depicts the item in a distorted (e.g., stretched thin) manner. Furthermore, the image 240 and the item depicted therein may be too small to effectively merchandise the item.

The image 250 is a yet further example of a low-quality image (e.g., relative to the image 111). As shown, the image 250 does not depict the full item and instead depicts only a portion of the item. Furthermore, the image 250 shows the portion of the item in an awkward orientation (e.g., nearly upside down when viewed on the webpage 100).

Figure 3:
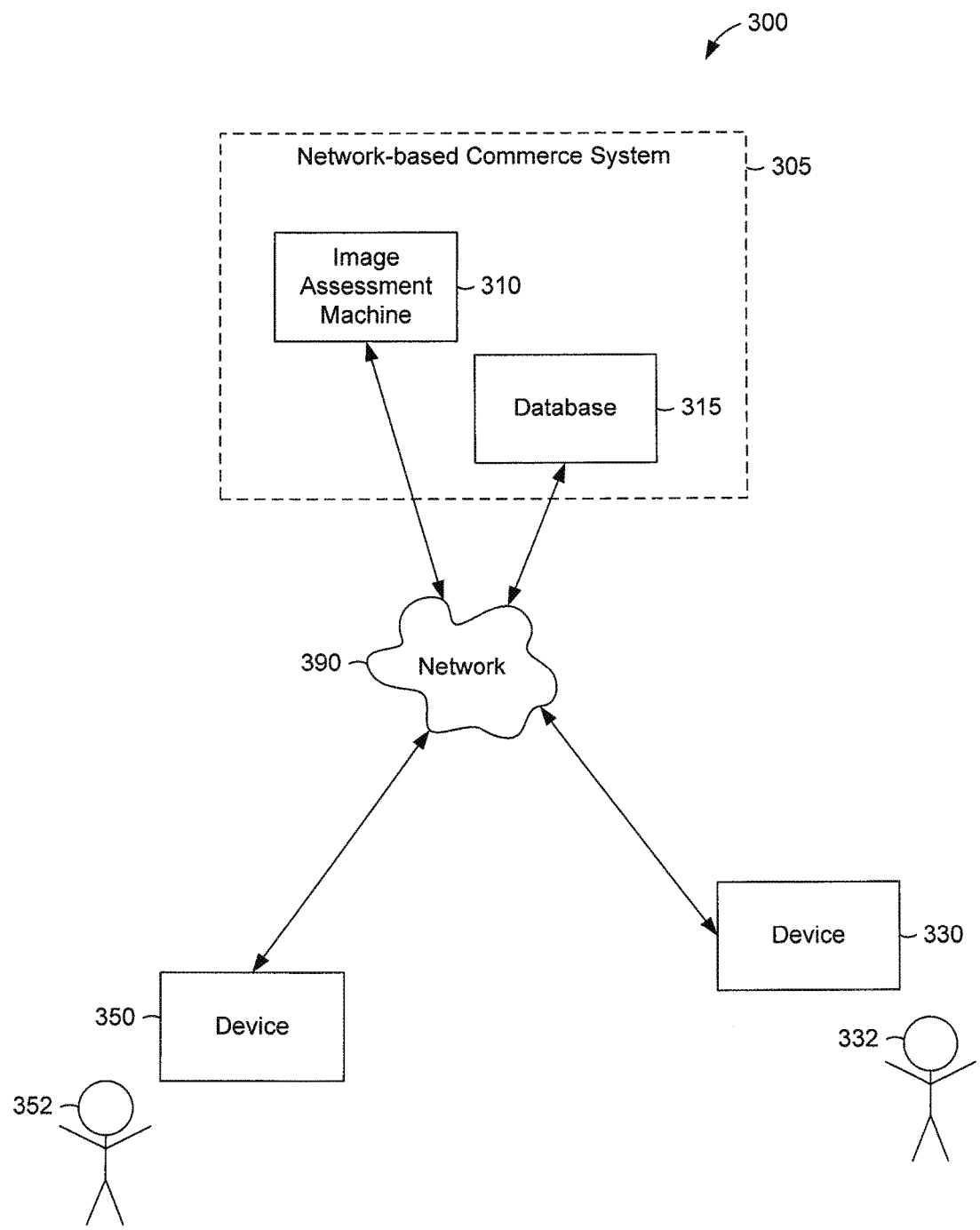
FIG. 3 is a network diagram illustrating a network environment suitable for image quality assessment to merchandise an item, according to some example embodiments.

FIG. 3 is a network diagram illustrating a network environment 300 suitable for image quality assessment to merchandise an item, according to some example embodiments. The network environment 300 includes an image assessment machine 310, a database 315, and devices 330 and 350, all communicatively coupled to each other via a network 390. In some example embodiments, the device 330 and the device 350 are connected to the image assessment machine 310 by a single network, while in alternative example embodiments, the devices 330 and 350 are connected to the image assessment machine 310 by multiple networks. The image assessment machine 310, the database 315, and the devices 330 and 350 each may be implemented in a computer system, in whole or in part, as described below with respect to FIG. 9.

The image assessment machine 310 is configured with one or more modules described below with respect to FIG. 4. As configured by the one or more modules, the image assessment machine 310 may perform all or part of a method described below with respect to FIG. 5-8. The image assessment machine 310 and the database 315 may form all or part of a network-based commerce system 305 (e.g., a network-based system that provides an online shopping website).

Also shown in FIG. 3 are users 332 and 352. For example, the user 332 may be a seller of the item (e.g., the pants) depicted in the image 111, and the user 352 may be a shopper for the item (e.g., a potential buyer of the item). One or both of the users 332 and 352 may be a human user (e.g., a human being), a machine user (e.g., a computer configured by a software program to interact with the device 330), or any suitable combination thereof (e.g., a human assisted by a machine or a machine supervised by a human). The user 332 is not part of the network environment 300, but is associated with the device 330 and may be a user of the device 330. For example, the device 330 may be a tablet computer or a smart phone belonging to the user 332. Likewise, the user 352 is not part of the network environment 300, but is associated with the device 350. As an example, the device 350 may be a tablet computer or a smart phone belonging to the user 352.

Any of the machines, databases, or devices shown in FIG. 3 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" is a data storage resource and may store data structured as a text file, a table, a spreadsheet, a relational database, a triple store, or any suitable combination thereof. Moreover, any two or more of the machines illustrated in FIG. 3 may be combined into a single machine, and the functions described herein for any single machine may be subdivided among multiple machines.

The network 390 may be any network that enables communication between machines (e.g., image assessment machine 310 and the device 330). Accordingly, the network 390 may be a wired network, a wireless network (e.g., a mobile network), or any suitable combination thereof. The network 390 may include one or more portions that constitute a private network, a public network (e.g., the Internet), or any suitable combination thereof.

Figure 4:
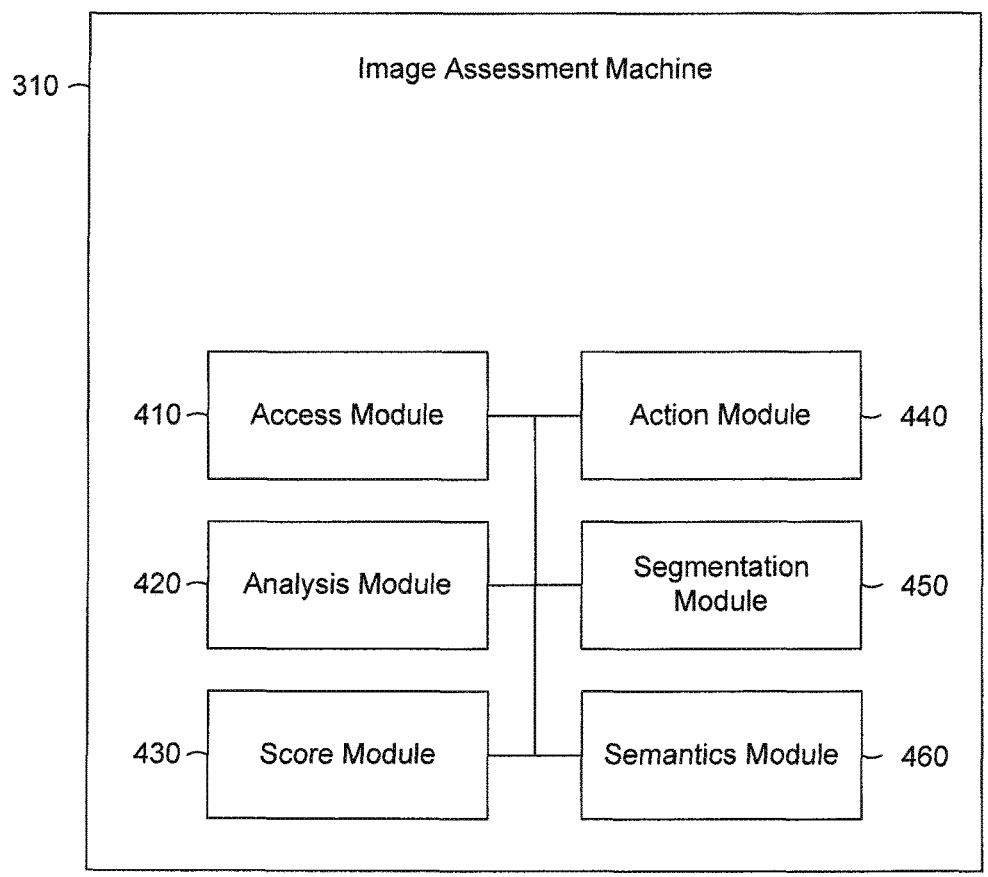
FIG. 4 is a block diagram illustrating components of an image assessment machine suitable for image quality assessment, according to some example embodiments.

FIG. 4 is a block diagram illustrating components of the image assessment machine 310, according to some example embodiments. The image assessment machine 310 includes an access module 410, an analysis module 420, a score module 430, an action module 440, a segmentation module 450, and the semantics module 460, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The access module 410 is configured to access the image 111 that depicts an item (e.g., pants). The image 111 may be accessed from the database 315 by the access module 410. As noted above, the image may have one or more visual characteristics that are quantifiable by an analysis of image data included in the image. Further details of the access module 410 are described below with respect to the example method illustrated by FIG. 5-8.

The analysis module 420 is configured to perform the analysis of the image data included in the image 111. Further details of the analysis module 420 are described below with respect to the example method illustrated by FIG. 5-8.

The score module 430 is configured to determine a score of the image 111, where the score determined by the score module 430 qualifies a visual characteristic (e.g., among multiple visual characteristics) of the image 111. Moreover, the determining of the score may be based on the analysis performed by the analysis module 420 (e.g., the analysis of the image data included in the image 111).

The action module 440 is configured to perform an operation that is pertinent to merchandising the item depicted by the image 111 (e.g., an operation that references the image 111, the textual information 113, the price 115, the item itself, or any suitable combination thereof). Moreover, the performing of the operations may be based on the score determined by the score module 430, which may be based on the analysis performed by the analysis module 420. Examples of the operation and further details of the action module 440 are described below with respect to the example method illustrated by FIG. 5-8.

The segmentation module 450 is configured to segment the image 111 into a foreground portion of the image 111 and a background portion of the image 111. For example, the segmentation module 450 may use a Grabcut-based approach (e.g., algorithm) to determine one or more edges of the foreground portion of the image 111 and distinguish it from the background portion of the image 111, resulting in segmentation of the image 111. With the image 111 segmented by the segmentation module 450, the analysis module 420, the score module 430, or both, may operate on the foreground portion separately from the background portion of the image 111. In some example embodiments, the segmentation module 450 is configured to determine (e.g., detect) a shape of the item (e.g., pants) depicted in the image 111, where the shape of the item is the foreground portion of the image 111. In other words, the foreground portion may depict the item, while the background portion depicts no part of the item. In addition, unless explicitly stated otherwise, all functionality of the analysis module 420 and the score module 430 described with respect to the entirety of the image 111 are similarly applicable to one or more portions of the image 111 (e.g., applicable to the foreground portion, to the background portion, or to both, separately or together).

The semantics module 460 is configured to perform semantic analysis on all or part of the image 111 (e.g., the foreground portion, the background portion, or both, separately or together). A semantic analysis performed by the semantics module 460 may be based on a shape detected in the image 111 (e.g., the shape of the item, as segmented into the foreground portion of the image 111), text detected in the image 111 (e.g., using one or more OCR techniques), or any suitable combination thereof. For example, the database 315 may store information correlating a shape of an item (e.g., pants) with a textual descriptor of the shape (e.g., the word "pants"), and the semantics module 460 may access the database 315 and access (e.g., read) the textual descriptor based on the shape. Further details of the semantics module 460 are described below with respect to the example method illustrated by FIG. 5-8.

Figure 5:
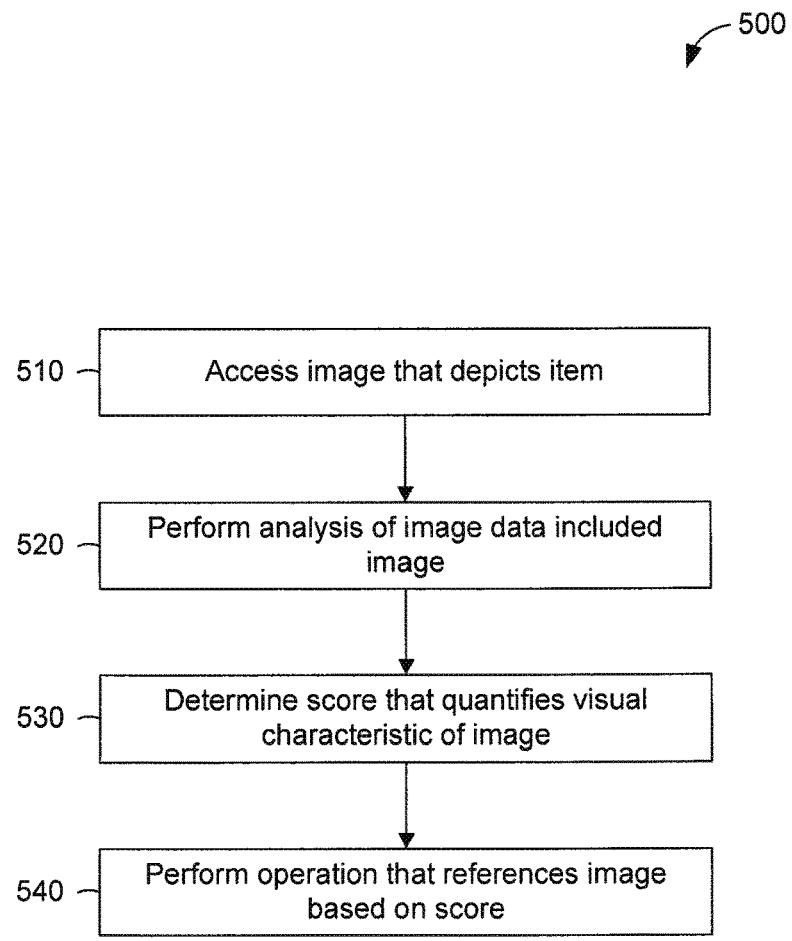
FIG. 5-8 are flowcharts illustrating operations of an image assessment machine in performing a method of image quality assessment to merchandise an item, according to some example embodiments.

FIG. 5-8 are flowcharts illustrating operations of the image assessment machine 310 in performing a method 500 of image quality assessment to merchandise an item, according to some example embodiments. Operations in a method 500 may be performed by the image assessment machine 310, using modules described above with respect to FIG. 4. As shown in FIG. 5, example embodiments of the method 500 include operations 510, 520, 530, and 540.

In operation 510, the access module 410 accesses the image 111 that depicts an item (e.g., pants). As noted above, the image 111 has one or more visual characteristics (e.g., a plurality of visual characteristics) that are quantifiable by an analysis of image data that is included in the image 111. Examples of such visual characteristics are discussed above with respect to FIG. 2.

In operation 520, the analysis module 420 performs the analysis of the image data that is included in the image 111, which is accessed in operation 510. According to various example embodiments, the analysis may include analyzing one or more of the visual characteristics of the image 111, and in certain example embodiments, multiple visual characteristics are analyzed in operation 520. Further details of operation 520, according to various example embodiments, are discussed below with respect to FIG. 6.

In operation 530, the score module 430 determines a score (e.g., a quality score, a visual quality score, or a merchandising effectiveness score) that quantifies a visual characteristic among the one or more visual characteristics of the image 111. The determining of the score may be based on the analysis performed in operation 520. According to various example embodiments, multiple scores may be determined for multiple visual characteristics of the image 111.

In operation 540, the action module 440 performs an operation (e.g., an action) that is pertinent to merchandising the item depicted by the image 111 (e.g., an operation that makes reference to the image 111, the textual information 113, the price 115, the item itself, or any suitable combination thereof). Operation 540 may be performed based on the score determined in operation 530. Further details of operation 540, according to various example embodiments, are discussed below with respect to FIG. 6-8.

Figure 6:
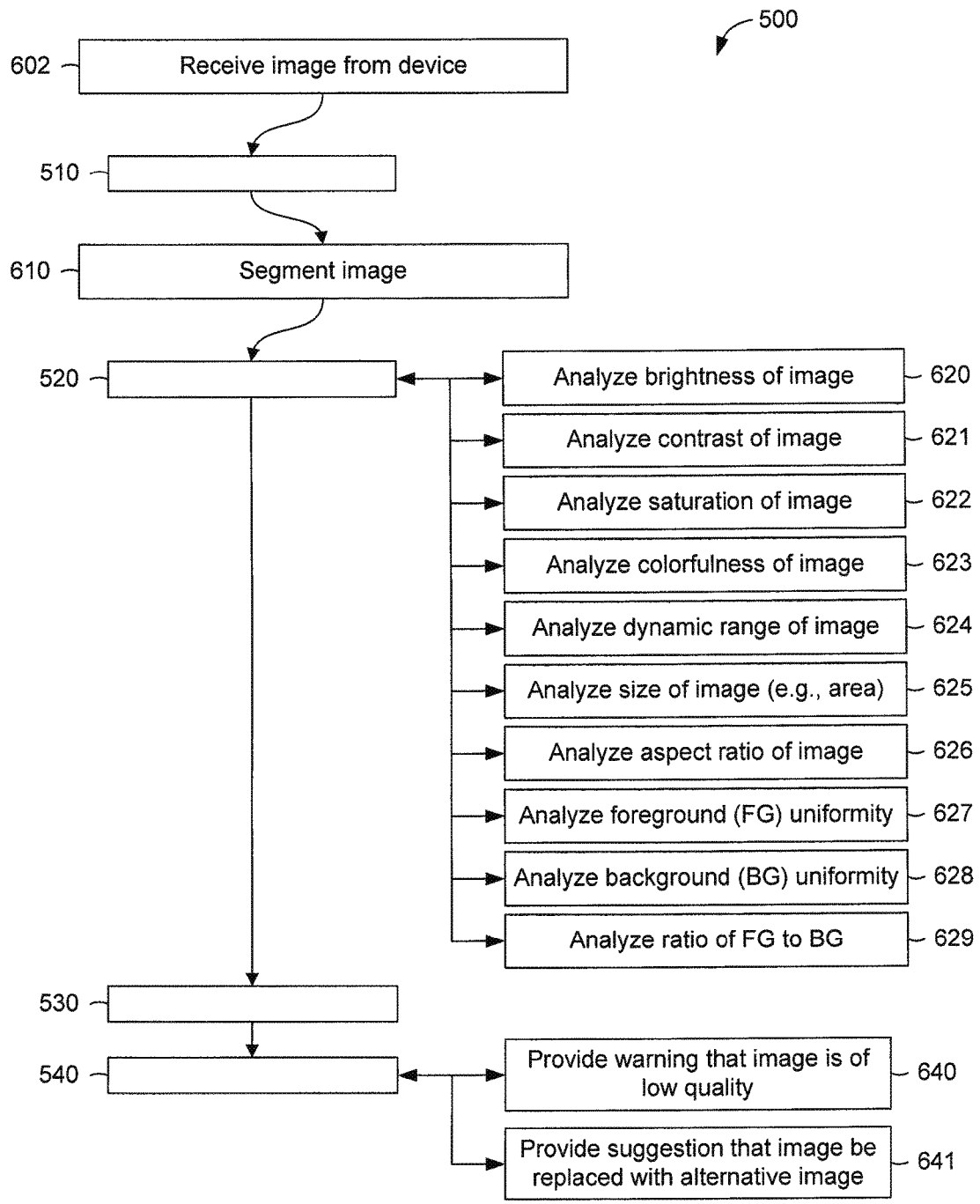

As shown in FIG. 6, the method 500 may include one or more of operations 602, 610, 620, 621, 622, 623, 624, 625, 626, 627, 628, 629, 640, and 641. In operation 602, the access module 410 receives the image 111. The image 111 may be received as a submission for inclusion in the advertisement 110 of the item (e.g., pants) depicted in the image 111. Moreover, the image 111 may be received from the user 332 (e.g., via the user device 330), who may be a seller of the item. According to some example embodiments, operation 540 may be performed in response to the reception of the image 111 in operation 602.

One or more of operations 640 and 641 may be performed as part (e.g., a precursor task, a subroutine, or a portion) of operation 540, in which the action module 440 performs an operation pertinent to the merchandising of the item depicted in the image 111. Various example embodiments of the method 500 include operation 640, operation 641, or both.

In operation 640, the action module 440 provides a warning that the image 111 is of low quality (e.g., "The image that you submitted is low quality. Would you like to submit a different one?"). The warning may be provided to the user 332 (e.g., as the seller of the item), for example, via the device 330.

In operation 641, the action module 440 provides a suggestion that the image 111 be replaced with an alternative image (e.g., an image of higher quality than the image 111 received in operation 602). For example, the suggestion may state, "A better image of your item is available. Would you like to use it instead?" The suggestion may be provided to the user 332 (e.g., as a seller of the item), for example, by the device 330.

One or more of operations 620-629 may be performed as part (e.g., a precursor task, a subroutine, or a portion) of operation 520, in which the analysis module 420 performs the analysis of the image data included in the image 111. According to various example embodiments, all or part of operations 620-629 may be included in the method 500, in any suitable combination.

A visual characteristic analyzed in operation 520 may be a brightness (e.g., brightness level) of the image 111. In operation 620, the analysis module 420 analyzes the brightness of the image 111. Accordingly, the score determined in operation 530 may quantify the brightness of the image 111, and operation 540 may be performed based on the brightness of the image 111.

A visual characteristic analyzed in operation 520 may be a contrast (e.g., contrast level) of the image 111. In operation 621, the analysis module 420 analyzes the contrast of the image 111. Accordingly, the score determined in operation 530 may quantify the contrast of the image 111, and operation 540 may be performed based on the contrast of the image 111.

A visual characteristic analyzed in operation 520 may be a saturation (e.g., color intensity level) of the image 111. In operation 622, the analysis module 420 analyzes the saturation of the image 111. Accordingly, the score determined in operation 530 may quantify the saturation of the image 111, and operation 540 may be performed based on the saturation of the image 111.

A visual characteristic analyzed in operation 520 may be a colorfulness of the image 111. In operation 623, the analysis module 420 analyzes the colorfulness of the image 111. Accordingly, the score determined in operation 530 may quantify the colorfulness of the image 111, and operation 540 may be performed based on the colorfulness of the image 111.

A visual characteristic analyzed in operation 520 may be a dynamic range (e.g., of brightness, of contrast, or of a particular color) of the image 111. In operation 624, the analysis module 420 analyzes the dynamic range of the image 111. Accordingly, the score determined in operation 530 may quantify the dynamic range of the image 111, and operation 540 may be performed based on the dynamic range of the image 111.

A visual characteristic analyzed in operation 520 may be a size (e.g., total area, total width, or total height) of the image 111. In operation 625, the analysis module 420 analyzes the size of the image 111. Accordingly, the score determined in operation 530 may quantify the size of the image 111, and operation 540 may be performed based on the size of the image 111.

A visual characteristic analyzed in operation 520 may be an aspect ratio (e.g., of width to height) of the image 111. In operation 626, the analysis module 420 analyzes the aspect ratio of the image 111. Accordingly, the score determined in operation 530 may quantify the aspect ratio of the image 111, and operation 540 may be performed based on the aspect ratio of the image 111.

Example embodiments that include one or more of operations 627-629 may also include operation 610. In operation 610, the segmentation module 450 segments the image 111 into a foreground portion of the image 111 and a background portion of the image 111. As noted above, the foreground portion depicts the item (e.g., pants), and the background portion depicts no part of the item.

A visual characteristic analyzed in operation 520 may be a foreground uniformity (e.g., a level of smoothness of the foreground portion) of the image 111. In operation 627, the analysis module 420 analyzes the foreground uniformity of the image 111. Accordingly, the score determined in operation 530 may quantify the foreground uniformity of the image 111, and operation 540 may be performed based on the foreground uniformity of the image 111.

A visual characteristic analyzed in operation 520 may be a background uniformity (e.g., a level of smoothness of the background portion) of the image 111. In operation 628, the analysis module 420 analyzes the background uniformity of the image 111. Accordingly, the score determined in operation 530 may quantify the background uniformity of the image 111, and operation 540 may be performed based on the background uniformity of the image 111.

A visual characteristic analyzed in operation 520 may be a ratio of a number of foreground pixels from the foreground portion to the number of background pixels from the background portion of the image 111. In operation 629, the analysis module 420 analyzes the ratio of foreground pixels to background pixels. Accordingly, the score determined in operation 530 may quantify the ratio of foreground pixels to background pixels of the image 111, and operation 540 may be performed based on the ratio of foreground pixels to background pixels of the image 111.

Figure 7:
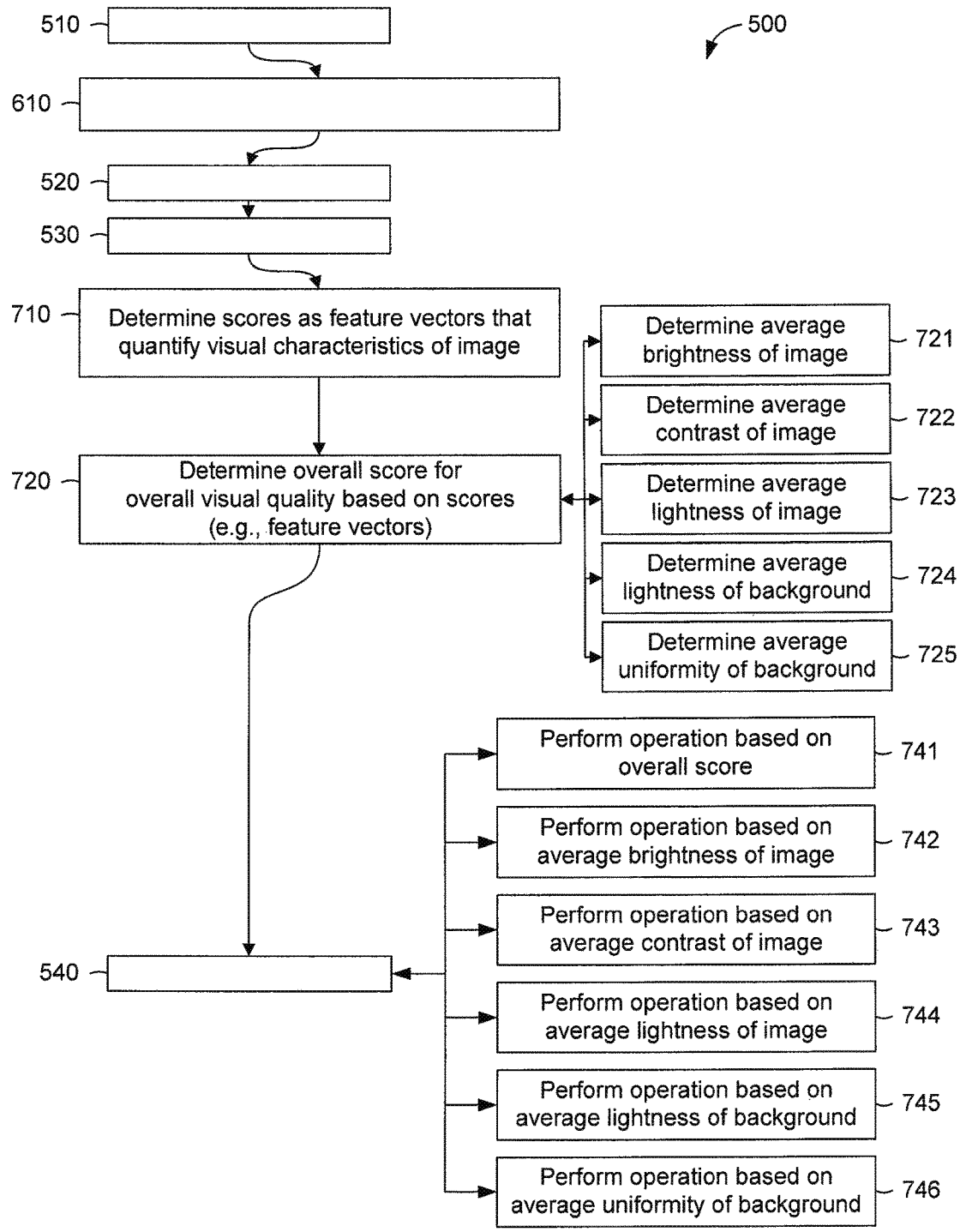

As shown in FIG. 7, the method 500 may include one or more of operations 710, 720, 721, 722, 723, 724, 725, 741, 742, 743, 744, 745, and 746. Operation 710 may expand upon operation 530, in which the score module 430 determines a score that quantifies a visual characteristic of the image 111. In operation 710, multiple scores (e.g., a plurality of scores) are determined by the score module 430, and these multiple scores may quantify multiple visual characteristics of the image 111. Moreover, the multiple scores may be determined as one or more feature vectors (e.g., multiple feature vectors or multiple components of a single multi-dimensional feature vector) that quantify the visual characteristics of the image 111 (e.g., in their entirety). Accordingly, a sophisticated profile of the image 111 may be represented by the scores determined in operation 710.

In operation 720, the score module 430 determines an overall score that represents an overall visual quality of the image 111, based on the scores determined in operation 710. For example, the score module 430 may compute the overall score as a weighted average of individual scores corresponding to individual visual characteristics of the image 111. As another example, the score module 430 may compute the overall score as a predominant feature vector (e.g., normalized within a multidimensional feature vector space). Accordingly, a sophisticated profile of the image 111 may be summarized by a single overall score determined in operation 720.

In example embodiments that include operation 720, the action module 440 may perform operation 540 based on the overall score determined in operation 720. This is shown as operation 741 in FIG. 7.

One or more of operations 721, 722, 723, 724, and 725 may be performed as part (e.g., a precursor task, a subroutine, or a portion) of operation 720, in which the score module 430 determines the overall score. In a corresponding manner, one or more of operations 742, 743, 744, 745, and 746 may be performed as part of operation 540.

In operation 721, the score module 430 determines an overall score that represents an average brightness of the image 111. Accordingly, in operation 742, the performing of the operation by the action module 440 may be based on the average brightness of the image determined 111 in operation 721.

In operation 722, the score module 430 determines an overall score that represents an average contrast of the image 111. Accordingly, in operation 743, the performing of the operation by the action module 440 may be based on the average contrast of the image 111 determined in operation 722.

In operation 723, the score module 430 determines an overall score that represents an average lightness of the image 111. Accordingly, in operation 744, the performing of the operation by the action module 440 may be based on the average lightness of the image 111 determined in operation 723.

In operation 724, the score module 430 determines an overall score that represents an average lightness of a background portion of the image 111 (e.g., segmented in operation 610). Accordingly, in operation 745, the performing of the operation by the action module 440 may be based on the average lightness of the background portion of the image 111 determined in operation 724.

In operation 725, the score module 430 determines an overall score that represents an average uniformity of a background portion of the image 111 (e.g., segmented in operation 610). Accordingly, in operation 746, the performing of the operation by the action module 440 may be based on the average uniformity of the background portion of the image 111 determined in operation 725.

Figure 8:
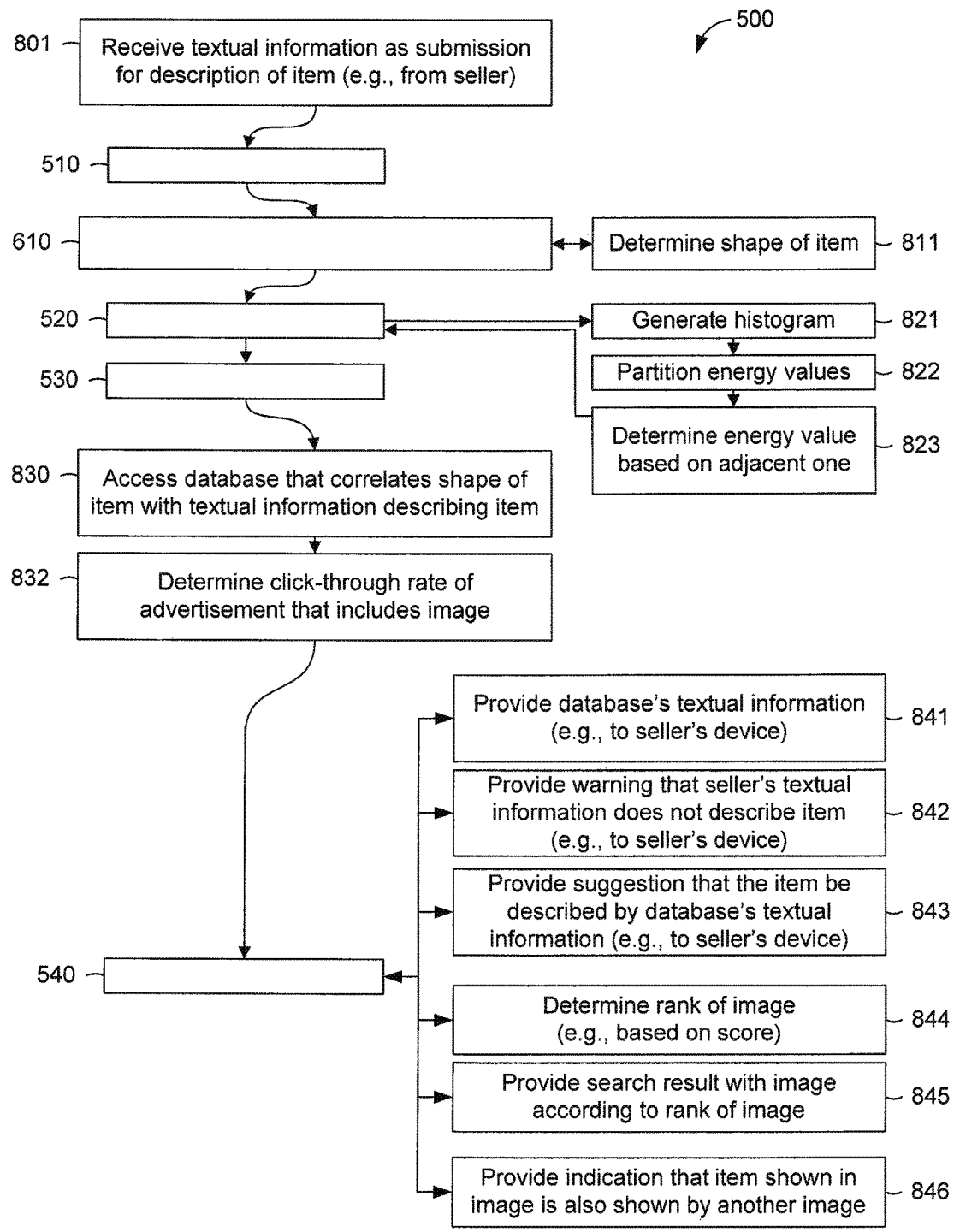

As shown in FIG. 8, the method 500 may include one or more of operations 801, 811, 821, 822, 823, 830, 832, 841, 842, 843, 844, 845, and 846. In some example embodiments, operations 801, 811, 830, and 841 are performed as part of the method 500.

In operation 801, the access module 410 receives textual information (e.g., textual information 113) as a submission for a description of the item. For example, the textual information may be received from the user 332 (e.g., as a seller of the item) via the device 330. The textual information received in operation 801 may be described as "seller-submitted textual information" or "seller's textual information" and may describe the item accurately, partially, poorly, or not at all.

Operation 811 may be performed as part (e.g., a precursor task, a subroutine, or a portion) of operation 610, in which the segmentation module 450 segments the image 111 into a foreground portion and a background portion. In operation 811, the segmentation module 450 determines the shape of the item (e.g., pants) detected in the image 111. For example, the shape of the item may be determined by segmenting the image 111 as discussed above with respect to operation 610 (e.g., determining of the outline of the pants).

In operation 830, the semantics module 460 accesses the database 315. In such example embodiments, the database 315 correlates the shape of the item (e.g., as determined in operation 811) with textual information (e.g., textual information 113) that describes the item. The textual information accessed in operation 830 may be described as "database-accessed textual information" or database's textual information" and may coincide, semantically or verbatim, with the seller-submitted textual information received in operation 801. In some situations, the database-accessed textual information is different (e.g., semantically different) from the seller-submitted textual information.

In example embodiments that include operation 830, the action module 440 may perform operation 841 as part (e.g., a precursor task, a subroutine, or a portion) of operation 540. In operation 841, the action module 440 provides the database-accessed textual information that was accessed in operation 830. The action module 440 may provide the database-accessed textual information based on the shape of the item (e.g., based on the shape of the item being correlated with the database-accessed textual information). For example, the database-accessed textual information may be provided to the user 332 (e.g., as the seller of the item) via the device 330.

According to some example embodiments, the database-accessed textual information (e.g., textual information 113, "pants") is more descriptive of the item depicted in the image 111 than the seller-submitted textual information (e.g., "duds I'm selling"). Such example embodiments may include one or more of operations 842 and 843, as part (e.g., a precursor task, a subroutine, or a portion) of operation 540.

In operation 842, the action module 440 provides a warning that the seller-submitted textual information (e.g., received in operation 801) does not describe the item depicted in the image 111. In some example embodiments, the warning states that the seller-submitted textual information does not describe the item as well as other textual information (e.g., available from the database 315). The warning may be provided to the user 332 (e.g., as the seller of the item) via the device 330. As an example, the seller-submitted textual information received in operation 801 may be the word "hat," and the warning may state, "That does not look like a 'hat'!"

In operation 843, the action module 440 provides a suggestion that the item depicted in the image 111 be described by the database-accessed textual information (e.g., accessed in operation 830). In some example embodiments, the suggestion proposes that the database-accessed textual information be used instead of the seller-submitted textual information. The suggestion may be provided to the user 332 (e.g., as the seller of the item) via the device 330. As an example, the database-accessed textual information may be the word "pants," and the suggestion may state, "That looks more like 'pants,' instead of a 'hat.' Would you like to update the description?"

According to various example embodiments, the image assessment machine 310 may monitor the effectiveness of one or more images (e.g., image 111) with respect to merchandising items depicted therein. As noted above, a click-through rate may form all or part of a measurement of effectiveness.

In operation 832, the score module 430 determines a click-through rate of the advertisement 110 that includes the image 111. In some example embodiments, the score module 430 calculates the click-through rate (e.g., from web server logs obtained from the network-based commerce system 305). In other example embodiments, the score module 430 accesses or receives the click-through rate (e.g., from a web server of the network-based commerce system 305).

In operation 844, the action module 440 (e.g., in performing operation 540) determines a rank of the image 111 (e.g., among other images included in other advertisements). The determination of the rank of the image 111 may be based on the click-through rate determined in operation 832, the score determined in operation 530, any of the multiple scores determined in operation 710, the overall score determined in operation 720, or any suitable combination thereof.

In operation 845, the action module 440 (e.g., in performing operation 540) provides the image 111 within the search result. For example, the action module 440 may provide a set of search results (e.g., retrieved from a search engine or from the database 315), where each search result is an advertisement, and where one of the advertisements is the advertisement 110 with the image 111. Moreover, the search result may be provided according to the ranks determined in operation 844. Accordingly, the click-through rate determined in operation 832, the score determined in operation 530, any of the multiple scores determined in operation 710, the overall score determined in operation 720, or any suitable combination thereof, may constitute one or more factors that influence the presentation of search results that have images for items referenced to therein. Hence, the visual characteristics of images may be analyzed to raise or lower the rankings of the images (e.g., for purposes of merchandising items depicted therein).

According to certain example embodiments, the image assessment machine 310 may detect images that depict the same item, despite the images having significantly distinct visual characteristics. Such significantly distinct visual characteristics may be due to differences in lighting conditions under which the images were captured (e.g., taken by their respective cameras). Accordingly, certain example embodiments of the method 500 include operations 821, 822, 823, and 846.

In operation 821, the analysis module 420 generates a histogram of the image 111 (e.g., based on the image data included in the image 111). The image 111 may depict the item (e.g., pants) under a particular lighting condition (e.g., a first lighting condition). The histogram generated in operation 821 may represent or depict energy levels of the image 111 (e.g., entity levels encoded by the image data included in the image 111). An energy level may also be referred to as an "energy value."

In operation 822, the analysis module 420 partitions the energy levels of the image 111 in two multiple partitions of a histogram (e.g., multiple sections or bands within the histogram). These multiple partitions may be known as "bins."

In some example embodiments, the energy levels within the multiple partitions of the histogram may be blurred or spread between adjoining partitions (e.g., neighboring bins). For example, the energy levels may be processed in a manner that determines or modifies the energy level of one partition based on the energy level of one or more neighboring partitions. In operation 823, the analysis module 420 performs such processing. In some example embodiments, the analysis module 420 determines an energy level (e.g., a first energy level) of a partition among the multiple partitions based on another energy level (e.g., a second energy level) in an adjacent partition among the multiple partitions. Accordingly, some example embodiments of the analysis module 420 may normalize one or more energy levels in the histogram relative to neighboring energy levels.

Based on the processing of the histogram in operations 821 and 822, the analysis module 420 may determine (e.g., detect) that the item shown under a particular lighting condition in the image 111 is also shown under a different lighting condition (e.g., a second lighting condition) in another image. In response to this determination, the action module 440, in operation 846, may provide an indication that the item depicted in the image 111 is also depicted in the other image (e.g., a further image). For example, the indication may state, "Here is another picture of the same item. Do you wish to use it instead?" In various example embodiments, such an indication may be provided as all or part of operation 540 (e.g., as all or part of operation 640 or operation 641).

According to various example embodiments, one or more of the methodologies described herein may facilitate image quality assessment to merchandise one or more items. Moreover, one or more of the methodologies described herein may facilitate identification of images that depict the same item, despite showing the item under different lighting conditions. Hence, one or more the methodologies described herein may facilitate presentation of advertisements or similar information regarding items depicted by images.

When these effects are considered in aggregate, one or more of the methodologies described herein may obviate a need for certain efforts or resources that otherwise would be involved in assessing image quality, merchandising items, identifying redundant images, or any suitable combination thereof. Efforts expended by a user in performing such tasks may be reduced by one or more of the methodologies described herein. Computing resources used by one or more machines, databases, or devices (e.g., within the network environment 300) may similarly be reduced. Examples of such computing resources include processor cycles, network traffic, memory usage, data storage capacity, power consumption, and cooling capacity.

Figure 9:
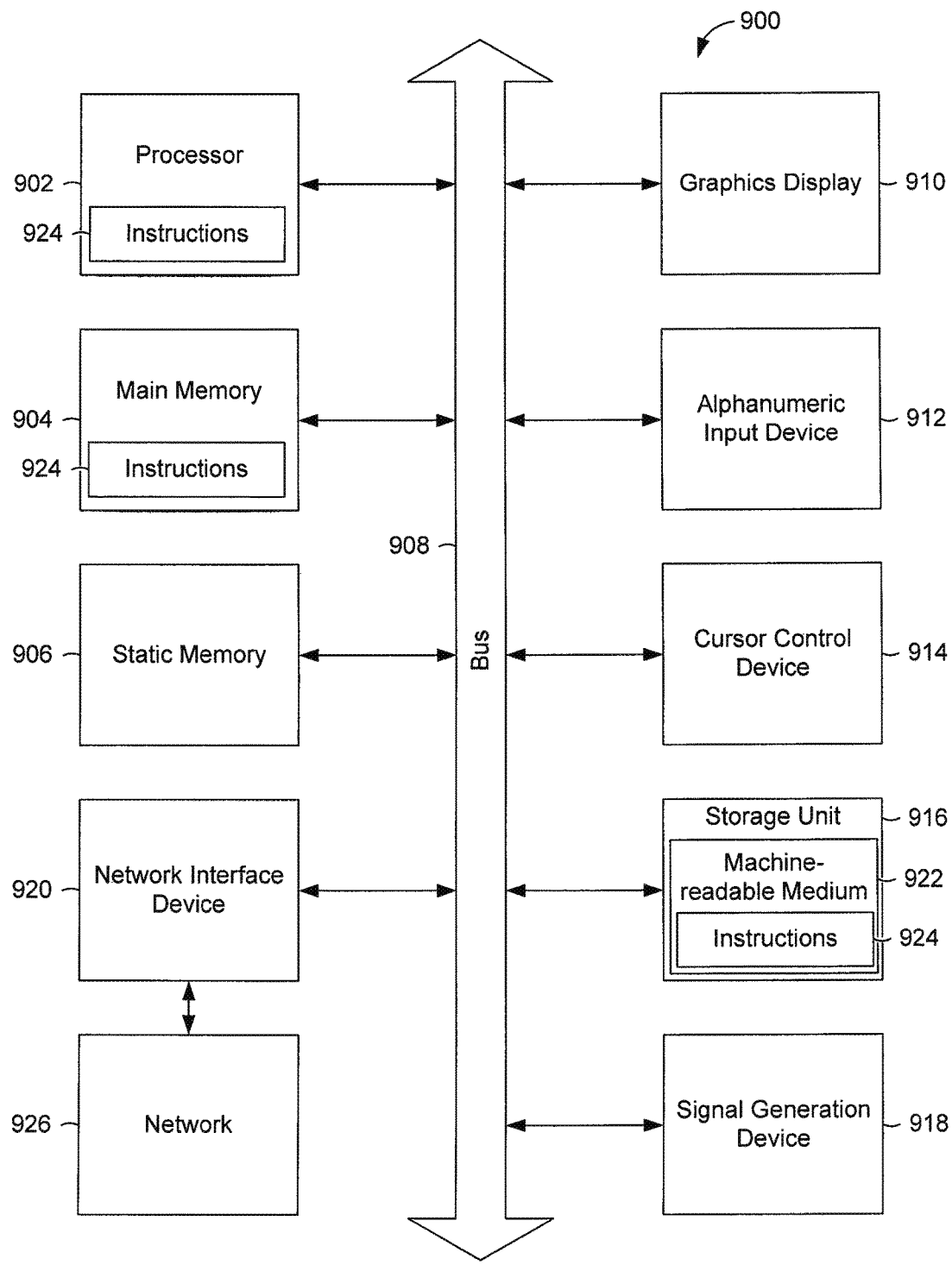
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 390) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium that is capable of storing instructions (e.g., software) for execution by a machine (e.g., machine 900), such that the instructions, when executed by one or more processors of the machine (e.g., processor 902), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following descriptions define various example embodiments of methods and systems (e.g., apparatus) discussed herein:

1. A method comprising:
accessing an image that depicts an item,
the image having a plurality of visual characteristics that are quantifiable by an analysis of image data included in the image;
performing the analysis of the image data included in the image that depicts the item and that has the plurality of visual characteristics;
determining a score that quantifies a visual characteristic among the plurality of visual characteristics of the image that depicts the item,
the determining of the score being based on the analysis of the image data included in the image that depicts the item,
the determining of the score being performed by a processor of a machine; and
performing an operation that makes reference to the image,
the operation being performed based on the score that quantifies the visual characteristic among the plurality of visual characteristics of the image that depicts the item.

2. The method of description 1 further comprising:
receiving the image as a submission from a seller of the item for inclusion in an advertisement of the item; and wherein
the performing of the operation includes providing a warning to the seller that the image is of low quality.

3. The method of description 1 or description 2 further comprising:
receiving the image as a submission from a seller of the item for inclusion in an advertisement of the item; and wherein
the performing of the operation includes providing a suggestion to the seller that the received image be replaced with an alternative image of higher quality.

4. The method of any of descriptions 1-3, wherein:
the visual characteristic is a brightness of the image; and
the performing of the analysis of the image data includes analyzing the brightness of the image;
the score quantifies the brightness of the image; and
the performing of the operation is based on the brightness of the image.

5. The method of any of descriptions 1-4, wherein:
the visual characteristic is a contrast of the image;
the performing of the analysis of the image data includes analyzing the contrast of the image;
the score quantifies the contrast of the image; and
the performing of the operation is based on the contrast of the image.

6. The method of any of descriptions 1-5, wherein:
the visual characteristic is a saturation of the image;
the performing of the analysis of the image data includes analyzing the saturation of the image;
the score quantifies the saturation of the image; and
the performing of the operation is based on the saturation of the image.

7. The method of any of descriptions 1-6, wherein:
the visual characteristic is a colorfulness of the image;
the performing of the analysis of the image data includes analyzing the colorfulness of the image;
the score quantifies the colorfulness of the image; and
the performing of the operation is based on the colorfulness of the image.

8. The method of any of descriptions 1-7, wherein:
the visual characteristic is a dynamic range of the image;
the performing of the analysis of the image data includes analyzing the dynamic range of the image;
the score quantifies the dynamic range of the image; and
the performing of the operation is based on the dynamic range of the image.

9. The method of any of descriptions 1-8, wherein:
the visual characteristic is a size of the image;
the performing of the analysis of the image data includes analyzing the size of the image;
the score quantifies the size of the image; and
the performing of the operation is based on the size of the image.

10. The method of any of descriptions 1-9, wherein:
the visual characteristic is an aspect ratio of the image;
the performing of the analysis of the image data includes analyzing the aspect ratio of the image;
the score quantifies the aspect ratio of the image; and
the performing of the operation is based on the aspect ratio of the image.

11. The method of any of descriptions 1-10 further comprising:
segmenting the image into a foreground portion of the image that depicts the item and a background portion of the image that depicts no part of the item; wherein
the visual characteristic is a uniformity of the foreground portion of the image;
the performing of the analysis of the image data includes analyzing the uniformity of the foreground portion of the image;
the score quantifies the uniformity of the foreground portion of the image; and
the performing of the operation is based on the uniformity of the foreground portion of the image.

12. The method of any of descriptions 1-11 further comprising:
segmenting the image into a foreground portion of the image that depicts the item and a background portion of the image that depicts no part of the item; wherein
the visual characteristic is a uniformity of the background portion of the image;
the performing of the analysis of the image data includes analyzing the uniformity of the background portion of the image;
the score quantifies the uniformity of the background portion of the image; and
the performing of the operation is based on the uniformity of the background portion of the image.

13. The method of any of descriptions 1-12 further comprising:
segmenting the image into a foreground portion of the image that depicts the item and a background portion of the image that depicts no part of the item; wherein
the visual characteristic is a ratio of a number of foreground pixels from the foreground portion to a number of background pixels from the background portion;
the performing of the analysis of the image data includes analyzing the ratio of the number of foreground pixels to the number of background pixels;
the score quantifies the ratio of the number of foreground pixels to the number of background pixels; and the performing of the operation is based on the ratio of the number of foreground pixels to the number of background pixels.

14. The method of any of descriptions 1-13 further comprising:
determining a plurality of scores as feature vectors that quantify the plurality of visual characteristics of the image; and
determining an overall score representative of an overall visual quality of the image based on the plurality of scores; wherein
the performing of the operation is based on the overall score that represents the overall visual quality of the image that depicts the item.

15. The method of description 14, wherein:
the overall score represents an average brightness of the image; and
the performing of the operation is based on the average brightness of the image.

16. The method of description 14 or description 15, wherein:
the overall score represents an average contrast to the image; and
the performing of the operation is based on the average contrast to the image.

17. The method of any of descriptions 14-16, wherein:
the overall score represents an average lightness of the image,
the average lightness indicating an average distance from white in a color space; and
the performing of the operation is based on the average lightness of the image.

18. The method of any of descriptions 14-17 further comprising:
segmenting the image into a foreground portion of the image that depicts the item and a background portion of the image that depicts no part of the item; wherein
the overall score represents an average lightness of the background portion of the image,
the average lightness indicating an average distance from white in a color space; and
the performing of the operation is based on the average lightness of the background portion of the image.

19. The method of any of descriptions 14-18 further comprising:
segmenting the image into a foreground portion of the image that depicts the item and a background portion of the image that depicts no part of the item; wherein
the overall score represents an average uniformity of the background portion of the image; and
the performing of the operation is based on the average uniformity of the background portion of the image.

20. The method of any of descriptions 1-19 further comprising:
determining a shape of the item by segmenting the image;
accessing a database that correlates the shape of the item with textual information that describes the item; and wherein
the performing of the operation includes providing the textual information based on the shape of the item being correlated with the textual information.

21. The method of description 20 further comprising:
receiving different textual information as a submission for a description of the item from a seller of the item; and wherein
the performing of the operation includes providing a warning to the seller that the different textual information does not describe the item.

22. The method of description 20 or description 21 further comprising:
receiving different textual information as a submission for a description of the item from a seller of the item; and wherein
the performing of the operation includes providing a suggestion to the seller that the item be described by the textual information accessed from the database.

23. The method of any of descriptions 1-22, wherein:
the performing of the operation includes determining a rank of the image of the item and providing the image of the item within a search result,
the search result being provided according to the determined rank among a plurality of search results.

24. The method of description 23 further comprising:
determining a click-through rate of an advertisement that includes the image; and wherein
the determining of the rank of the image is based on the click-through rate of the advertisement.

25. The method of any of descriptions 1-24, wherein:
the image depicts the item under a first lighting condition;
the performing of the analysis of the image data includes:
generating a histogram of the image,
partitioning energy values from the histogram of the image into multiple partitions of the histogram, and
determining a first energy value of a partition among the multiple partitions based on a second energy value of an adjacent partition among the multiple partitions; and
the performing of the operation includes providing an indication that the item depicted in the image is also depicted in a further image that depicts the item under a second lighting condition.

26. A non-transitory machine-readable storage medium comprising instructions that, when executed by one or more processors of a machine, cause the machine to perform operations comprising:
accessing an image that depicts an item,
the image having a plurality of visual characteristics that are quantifiable by an analysis of image data included in the image;
performing the analysis of the image data included in the image that depicts the item and that has the plurality of visual characteristics;
determining a score that quantifies a visual characteristic among the plurality of visual characteristics of the image that depicts the item,
the determining of the score being based on the analysis of the image data included in the image that depicts the item,
the determining of the score being performed by the one or more processors of the machine; and
performing an operation that makes reference to the image,
the operation being performed based on the score that quantifies the visual characteristic among the plurality of visual characteristics of the image that depicts the item.

27. The non-transitory machine-readable storage medium of description 26, wherein the operations further comprise:
receiving the image as a submission from a seller of the item for inclusion in an advertisement of the item; and wherein the performing of the operation includes providing a warning to the seller that the image is of low quality.

28. A system comprising:
an access module configured to access an image that depicts an item,
the image having a plurality of visual characteristics that are quantifiable by an analysis of image data included in the image;
an analysis module configured to perform the analysis of the image data included in the image that depicts the item and that has the plurality of visual characteristics;
a processor configured by a score module that configures the processor to determine a score that quantifies a visual characteristic among the plurality of visual characteristics of the image that depicts the item,
the determining of the score being based on the analysis of the image data included in the image that depicts the item,
the determining of the score being performed by a processor of a machine; and
an action module configured to perform an operation that makes reference to the image,
the operation being performed based on the score that quantifies the visual characteristic among the plurality of visual characteristics of the image that depicts the item.

29. The system of description 28, wherein:
the access module is configured to receive the image as a submission from a seller of the item for inclusion in an advertisement of the item; and wherein
the operation module is configured to provide a warning to the seller that the image is of low quality.

What is claimed is:

1. A system comprising:
a processor; and
a memory storing instructions that, when executed by the processor, causes the processor to perform operations comprising:
receiving item listing data that includes at least image data and textual data, wherein the image data comprises an image that includes a plurality of visual characteristics, and the textual data comprises a textual input to be applied to the image;
identifying an item depicted by the image based on the plurality of visual characteristics;
performing a comparison of the item depicted by the image and the textual input to be applied to the image;
determining, based on the comparison of the item depicted by the image and the textual input, that the item depicted by the image does not correlate with the textual input; and
causing display of a notification at the client device in response to the determining that the item depicted by the image does not correlate with the textual input, the notification comprising a presentation of a request for an alternate image, the presentation of the request comprising a display of a text string that includes the textual input.

2. The system of claim 1; wherein the identifying the item depicted by the image based on the plurality of visual characteristics includes:
detecting one or more edges of the item based on the plurality of visual characteristics; and
detecting the item based on the one or more edges of the item.

3. The system of claim 1, wherein:
the visual characteristic is a brightness of the foreground portion of the image, and wherein the set of scores includes a score of the brightness of the foreground portion of the image.

4. The system of claim 1, wherein:
the visual characteristic is a contrast level of the foreground portion of the image, and wherein the set of scores includes a score of the contrast level of the foreground portion of the image.

5. The system of claim 1, wherein:
the visual characteristic is a saturation of the first foreground portion of the image, and wherein the set of scores includes a score of the saturation of the foreground portion of the image.

6. The system of claim 1, wherein:
the visual characteristic is an aspect ratio of the foreground portion of the image, and wherein the set of scores includes a score of the aspect ratio of the foreground portion of the image.

7. The system of claim 1, wherein:
the visual characteristic is a uniformity of the foreground portion of the image; and wherein the set of scores includes a score of the uniformity of the foreground portion of the image.

8. The system of claim 1, wherein:
the visual characteristic is a uniformity of the background portion of the image, and wherein the set of scores includes a score of the uniformity of the background portion of the image; and
wherein the calculating the overall score of the image is based on the set of scores of the foreground portion of the image and the background portion of the image.

9. The system of claim 1, wherein the visual characteristic is a ratio of a number of foreground pixels from the foreground portion of the image to a number of background pixels from the background portion of the image; and
wherein the calculating the set of scores includes calculating a score based on the ratio.

10. The system of claim 1, wherein:
the visual characteristic is an average lightness of the image, and wherein the set of scores includes a score of the average lightness of the image.

11. The system of claim 1, wherein:
the image is a first image that depicts an item under a first lighting condition;
determining that the item depicted under the first lighting condition is also depicted in a second image that depicts the item under a second lighting condition; and
based on the determining, providing an indication that the item depicted in the first image is also depicted in the second image under the second lighting condition.

12. A method comprising:
receiving item listing data that includes at least image data and textual data, wherein the image data comprises an image that includes a plurality of visual characteristics, and the textual data comprises a textual input to be applied to the image;
identifying an item depicted by the image based on the one or more edges of the foreground portion of the image;
performing a comparison of the item depicted by the image and the textual input to be applied to the image;
determining, based on the comparison of the item depicted by the image and the textual input, that the item depicted by the image does not correlate with the textual input; and causing display of a notification at the client device in response to the determining that the item depicted by the image does not correlate with the textual input, the notification comprising a presentation of a request for an alternate image, the presentation of the request comprising a display of a text string that includes the textual input.

13. The method of claim 12, wherein the identifying the item depicted by the image based on the plurality of visual characteristics includes:

detecting one or more edges of the item based on the plurality of visual characteristics; and detecting the item based on the one or more edges of the item.

14. The method of claim 12, wherein:

the visual characteristic is a brightness of the foreground portion of the image, and the set of scores includes a score of the brightness of the foreground portion of the image.

15. The method of claim 12, wherein:

the visual characteristic is a contrast level of the foreground portion of the image, and wherein the set of scores includes a score of the contrast level of the foreground portion of the image.

16. The method of claim 12, wherein:

the visual characteristic is a saturation of the first foreground portion of the image, and wherein the set of scores includes a score of the saturation of the foreground portion of the image.

17. The method of claim 12, wherein:

the visual characteristic is an aspect ratio of the foreground portion of the image, and wherein the set of scores includes a score of the aspect ratio of the foreground portion of the image.

18. The method of claim 12, wherein:

the visual characteristic is a uniformity of the foreground portion of the image, and wherein the set of scores includes a score of the uniformity of the foreground portion of the image.

19. A non-transitory machine-readable storage medium comprising instructions that, when executed by one or more processors of a machine, cause the machine to perform operations comprising:

receiving item listing data that includes textual data, and image data from a client device, wherein the image data comprises a plurality of visual characteristics, and the textual data comprises a textual input to be applied to the image;

identifying an item depicted by the image based on the plurality of visual characteristics;

performing a comparison of the item depicted by the image and the textual input to be applied to the image;

determining, based on the comparison of the item depicted by the image and the textual input, that the item depicted by the image does not correlate with the textual input; and causing display of a notification at the client device in response to the determining that the item depicted by the image does not correlate with the textual input, the notification comprising a presentation of a request for an alternate image, the presentation of the request comprising a display of a text string that includes the textual input.

20. The non-transitory machine-readable storage medium of claim 19, wherein the identifying the item depicted by the image based on the plurality of visual characteristics includes:

detecting one or more edges of the item based on the plurality of visual characteristics; and detecting the item based on the one or more edges of the item.

* * * * *

UNITED STATES PATENT AND TRADEMARK OFFICE
CERTIFICATE OF CORRECTION

PATENT NO. : 10,497,032 B2  
APPLICATION NO. : 15/015281  
DATED : December 3, 2019  
INVENTOR(S) : Anjan Goswami et al.

Page 1 of 1

It is certified that error appears in the above-identified patent and that said Letters Patent is hereby corrected as shown below:

In the Claims

In Column 27, Line 61, in Claim 2, delete "claim 1;" and insert -- claim 1, --, therefor.

In Column 28, Line 23, in Claim 7, delete "image;" and insert -- image, --, therefor.

In Column 29, Line 17, in Claim 14, after "and" insert -- wherein --.

Signed and Sealed this  
Twenty-first Day of July, 2020

Andrei Iancu  
*Director of the United States Patent and Trademark Office*